United States Patent
Min et al.

(10) Patent No.: US 12,139,566 B2
(45) Date of Patent: Nov. 12, 2024

(54) SUPPORTED CATALYST FOR PROPYLENE POLYMERIZATION AND METHOD FOR PRODUCING POLYPROPYLENE RESIN USING SAME

(71) Applicant: LOTTE CHEMICAL CORPORATION, Seoul (KR)

(72) Inventors: Joon Keun Min, Daejeon (KR); Eun Hye Shin, Daejeon (KR); Rai Ha Lee, Daejeon (KR); Hae In Lee, Daejeon (KR); Su Jeong Jeong, Daejeon (KR); Byung Hun Chae, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 627 days.

(21) Appl. No.: 17/294,361

(22) PCT Filed: Nov. 14, 2019

(86) PCT No.: PCT/KR2019/015494
§ 371 (c)(1),
(2) Date: May 14, 2021

(87) PCT Pub. No.: WO2020/101373
PCT Pub. Date: May 22, 2020

(65) Prior Publication Data
US 2022/0010044 A1    Jan. 13, 2022

(30) Foreign Application Priority Data
Nov. 15, 2018 (KR) .................. 10-2018-0140936

(51) Int. Cl.
C08F 210/06 (2006.01)
C07F 17/00 (2006.01)
C08F 4/02 (2006.01)
C08F 4/76 (2006.01)

(52) U.S. Cl.
CPC ............ *C08F 210/06* (2013.01); *C07F 17/00* (2013.01); *C08F 4/02* (2013.01); *C08F 4/76* (2013.01); *C08F 2420/10* (2021.01)

(58) Field of Classification Search
None
See application file for complete search history.

(56) References Cited

U.S. PATENT DOCUMENTS

| | | | |
|---|---|---|---|
| 5,504,169 A | 4/1996 | Canich | |
| 2007/0255018 A1* | 11/2007 | Brant | .............. C08F 110/06 526/89 |
| 2018/0194873 A1 | 7/2018 | Kwon et al. | |

FOREIGN PATENT DOCUMENTS

| CN | 1292003 A | 4/2001 |
|---|---|---|
| CN | 101291960 A | 10/2008 |
| CN | 102834422 A | 12/2012 |
| JP | 2012214780 A | 11/2012 |
| KR | 100353066 B1 | 9/2002 |
| KR | 20100067627 A | 6/2010 |
| KR | 20110114473 A | 10/2011 |
| KR | 20160029718 A | 3/2016 |
| KR | 20160039406 A | 4/2016 |
| KR | 101711788 B1 | 3/2017 |
| KR | 20170037195 A | 4/2017 |

OTHER PUBLICATIONS

International Search Report issued in International Application No. PCT/KR2019/015494 dated Mar. 17, 2020 (3 pages).
Written Opinion issued in International Application No. PCT/KR2019/015494 dated Mar. 17, 2020 (5 pages).
Office Action issued in corresponding CN Application No. 201980072990.0 with English translation dated Sep. 19, 2022 (19 pages).
Extended European Search Report issued in corresponding EP Application No. 19883715.5 dated Jul. 21, 2022 (6 pages).

* cited by examiner

*Primary Examiner* — Catherine S Branch
(74) *Attorney, Agent, or Firm* — Osha Bergman Watanabe & Burton LLP

(57) ABSTRACT

The present invention relates to a supported catalyst for propylene polymerization in which a first transition metal compound contributing to the production of crystalline polypropylene and a second transition metal compound contributing to the production of rubbery polypropylene are co-supported, and a method for producing a polypropylene resin using same. By using the supported catalyst, according to the present invention, it is possible to produce, by a single step of propylene polymerization, a polypropylene resin in which crystalline polypropylene and rubbery polypropylene are simultaneously formed.

13 Claims, No Drawings

SUPPORTED CATALYST FOR PROPYLENE POLYMERIZATION AND METHOD FOR PRODUCING POLYPROPYLENE RESIN USING SAME

TECHNICAL FIELD

The present invention relates to a supported catalyst for propylene polymerization and a method of producing a polypropylene resin using the same, and more particularly, to a supported catalyst in which a first transition metal compound contributing to the formation of crystalline polypropylene and a second transition metal compound contributing to the formation of rubbery polypropylene are co-supported, and a method of producing a polypropylene resin using the same.

BACKGROUND ART

In general, polypropylene resins are lightweight and have excellent mechanical properties compared to their price, and thus are widely used as materials for injection-molded products or films. In recent years, the use of polypropylene-based products is expanding from simple exterior finishing materials or packaging materials to various fields requiring durability depending on the user's environment. In particular, as the size of products using polypropylene resins increases, the thickness of the products is decreasing in order to reduce the weight of the products. However, since the thickness is reduced, the polypropylene products are easily damaged by external impact, and to improve this issue, a polypropylene product having higher rigidity and impact resistance is required.

Conventionally, to improve the impact strength of polypropylene resins, methods of blending the polypropylene resins with a certain amount of rubber have been used. These methods can be broadly divided into two categories, the first being methods of producing a polypropylene resin in a polymerization process and then adding ethylene to a gas-phase process to produce rubber, and the second being methods of blending polypropylene and rubber through an extrusion process.

For example, Patent Document 1 (Korean Patent Publication No. 10-0353066) describes a method of manufacturing an injection-molded product using polypropylene and ethylene-propylene-diene rubber as main components and using a twin-screw extruder. However, in this case, a problem may arise concerning the dispersibility of ethylene-propylene-diene rubber, and price increases.

In addition, one embodiment of Patent Document 2 (Korean Patent Publication No. 10-2016-0039406) discloses a method of producing a polypropylene impact copolymer including: producing a polypropylene homopolymer; and inputting ethylene and propylene into a reactor in which the polypropylene homopolymer is present and reacting in a gas phase, and thus producing an ethylene-propylene block copolymer (rubber). However, in the case of the polypropylene impact copolymer produced according to Patent Document 2, a rubber component in polypropylene may be liberated and adhere to the inner walls of a reactor, a heat exchanger, a cooler, and the like and cause fouling.

In addition, both of the above-described related art methods have a disadvantage in that an additional process is required for forming a rubber component after the production of polypropylene.

Therefore, there is a need for research to develop a supported catalyst that does not cause fouling and enables a polypropylene resin including a rubber component to be produced with only one polymerization step without an additional process after the polymerization of propylene.

RELATED-ART DOCUMENTS

Patent Document (Patent Document 1) KR 100353066 B
(Patent Document 2) KR 1020160039406 A

DISCLOSURE

Technical Problem

The present invention is directed to providing a supported catalyst for propylene polymerization in which a first transition metal compound contributing to the formation of crystalline polypropylene and a second transition metal compound contributing to the formation of rubbery polypropylene are co-supported.

In addition, the present invention is directed to providing a method of producing a polypropylene resin, which uses the above-described supported catalyst and thus is capable of simultaneously forming crystalline polypropylene and rubbery polypropylene with only one propylene polymerization step.

Technical Solution

One aspect of the present invention provides a supported catalyst for propylene polymerization, which includes: one or more first transition metal compounds selected from among compounds represented by Chemical Formulas 1 and 2 below; one or more second transition metal compounds selected from among compounds represented by Chemical Formulas 3 and 4 below; and a carrier for co-supporting the first and second transition metal compounds.

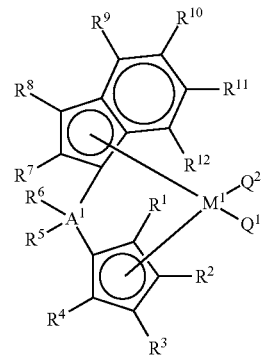

Chemical Formula 1

In Chemical Formula 1,
$M^1$ is a group 4 transition metal,
$Q^1$ and $Q^2$ are the same or different, and are each independently: a halogen group; a ($C_1$-$C_{20}$) alkyl group; a ($C_2$-$C_{20}$) alkenyl group; a ($C_2$-$C_{20}$) alkynyl group; a ($C_6$-$C_{20}$) aryl group; a ($C_1$-$C_{20}$) alkyl ($C_6$-$C_{20}$) aryl group; a ($C_6$-$C_{20}$) aryl ($C_1$-$C_{20}$) alkyl group; a ($C_1$-$C_{20}$) alkylamido group; a ($C_6$-$C_{20}$) arylamido group; or a ($C_1$-$C_{20}$) alkylidene group, $A^1$ is a group 14 element, $R^1, R^2, R^3, R^4, R^7, R^8, R^9, R^{10}, R^{11}$, and $R^{12}$ are the same or different, and are each independently: hydrogen; a $(C_1-C_{20})$ alkyl group unsubstituted or substituted with an acetal group or ether group; a $(C_2-C_{20})$ alkenyl group unsubstituted or substituted with an acetal group or ether group; a $(C_6-C_{20})$ aryl group unsubstituted or substituted with an acetal group or ether group; a $(C_1-C_{20})$ alkyl $(C_6-C_{20})$ aryl group unsubstituted or substituted with an acetal group or ether group; a $(C_6-C_{20})$ aryl $(C_1-C_{20})$ alkyl group unsubstituted or substituted with an acetal group or ether group; or a $(C_1-C_{20})$ silyl group unsubstituted or substituted with an acetal group or ether group, two or more groups among $R^1, R^2, R^3$, and $R^4$ may form an aliphatic ring or aromatic ring by being bonded to each other, two or more groups among $R^7, R^8, R^9, R^{10}, R^{11}$, and $R^{12}$ may form an aliphatic ring or aromatic ring by being bonded to each other, and $R^5$ and $R^6$ are the same or different, and are each independently: hydrogen; a $(C_1-C_{20})$ alkyl group; a $(C_2-C_{20})$ alkenyl group; a $(C_2-C_{20})$ alkynyl group; a $(C_6-C_{20})$ aryl group; a $(C_1-C_{20})$ alkyl $(C_6-C_{20})$ aryl group; a $(C_6-C_{20})$ aryl $(C_1-C_{20})$ alkyl group; a $(C_1-C_{20})$ alkylamido group; a $(C_6-C_{20})$ arylamido group; or a $(C_1-C_{20})$ alkylidene group.

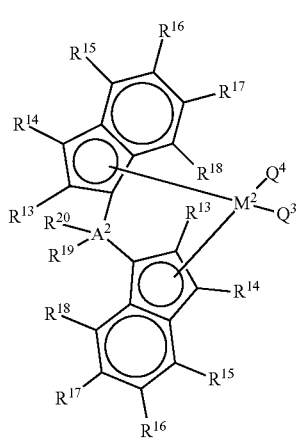

Chemical Formula 2

In Chemical Formula 2, $M^2$ is a group 4 transition metal.

$Q^3$ and $Q^4$ are the same or different, and are each independently: a halogen group; a $(C_1-C_{20})$ alkyl group; a $(C_2-C_{20})$ alkenyl group; a $(C_2-C_{20})$ alkynyl group; a $(C_6-C_{20})$ aryl group; a $(C_1-C_{20})$ alkyl $(C_6-C_{20})$ aryl group; a $(C_6-C_{20})$ aryl $(C_1-C_{20})$ alkyl group; a $(C_1-C_{20})$ alkylamido group; a $(C_6-C_{20})$ arylamido group; or a $(C_1-C_{20})$ alkylidene group, $A^2$ is a group 14 element, $R^{13}, R^{14}, R^{15}, R^{16}, R^{17}$, and $R^{18}$ are the same or different, and are each independently: hydrogen; a $(C_1-C_{20})$ alkyl group unsubstituted or substituted with an acetal group or ether group; a $(C_2-C_{20})$ alkenyl group unsubstituted or substituted with an acetal group or ether group; a $(C_6-C_{20})$ aryl group unsubstituted or substituted with an acetal group or ether group: a $(C_1-C_{20})$ alkyl $(C_6-C_{20})$ aryl group unsubstituted or substituted with an acetal group or ether group; a $(C_6-C_{20})$ aryl $(C_1-C_{20})$ alkyl group unsubstituted or substituted with an acetal group or ether group; or a $(C_1-C_{20})$ silyl group unsubstituted or substituted with an acetal group or ether group, two or more groups among $R^{13}, R^{14}, R^{15}, R^{16}, R^{17}$, and $R^{18}$ may form an aliphatic ring or aromatic ring by being bonded to each other, and $R^{19}$ and $R^{20}$ are the same or different, and are each independently: hydrogen; a $(C_1-C_{20})$ alkyl group; a $(C_2-C_{20})$ alkenyl group; a $(C_2-C_{20})$ alkynyl group; a $(C_6-C_{20})$ aryl group; a $(C_1-C_{20})$ alkyl $(C_6-C_{20})$ aryl group; a $(C_6-C_{20})$ aryl $(C_1-C_{20})$ alkyl group; a $(C_1-C_{20})$ alkylamido group; a $(C_6-C_{20})$ arylamido group; or a $(C_1-C_{20})$ alkylidene group.

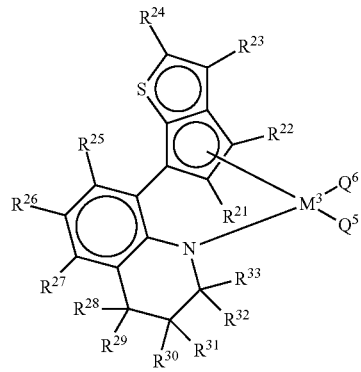

Chemical Formula 3

In Chemical Formula 3, $M^3$ is a group 4 transition metal, $Q^5$ and $Q^6$ are the same or different, and are each independently: a halogen group; a $(C_1-C_{20})$ alkyl group; a $(C_2-C_{20})$ alkenyl group; a $(C_2-C_{20})$ alkynyl group; a $(C_6-C_{20})$ aryl group; a $(C_1-C_{20})$ alkyl $(C_6-C_{20})$ aryl group; a $(C_6-C_{20})$ aryl $(C_1-C_{20})$ alkyl group; a $(C_1-C_{20})$ alkylamido group; a $(C_6-C_{20})$ arylamido group; or a $(C_1-C_{20})$ alkylidene group, $R^{21}, R^{22}, R^{23}, R^{24}, R^{25}, R^{26}, R^{27}, R^{28}, R^{29}, R^{30}, R^{31}, R^{32}$, and $R^{33}$ are the same or different, and are each independently: hydrogen; a $(C_1-C_{20})$ alkyl group unsubstituted or substituted with an acetal group or ether group; a $(C_2-C_{20})$ alkenyl group unsubstituted or substituted with an acetal group or ether group; a $(C_6-C_{20})$ aryl group unsubstituted or substituted with an acetal group or ether group; a $(C_1-C_{20})$ alkyl $(C_6-C_{20})$ aryl group unsubstituted or substituted with an acetal group or ether group; a $(C_6-C_{20})$ aryl $(C_1-C_{20})$ alkyl group unsubstituted or substituted with an acetal group or ether group; or a $(C_1-C_{20})$ silyl group unsubstituted or substituted with an acetal group or ether group; a $(C_1-C_{20})$ alkoxy group: or a $(C_6-C_{20})$ aryloxy group, and two or more groups among $R^{21}, R^{22}, R^{23}, R^{24}, R^{25}, R^{26}$, and $R^{27}$ may form an aliphatic ring or aromatic ring by being bonded to each other.

Chemical Formula 4

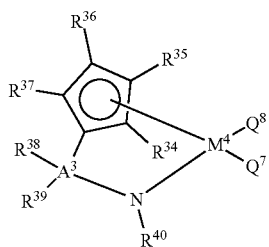

In Chemical Formula 4, $M^4$ is a group 4 transition metal, $Q^7$ and $Q^8$ are the same or different, and are each independently: a halogen group; a ($C_1$-$C_{20}$) alkyl group; a ($C_2$-$C_{20}$) alkenyl group; a ($C_2$-$C_{20}$) alkynyl group; a ($C_6$-$C_{20}$) aryl group; a ($C_1$-$C_{20}$) alkyl ($C_6$-$C_{20}$) aryl group; a ($C_6$-$C_{20}$) aryl ($C_1$-$C_{20}$) alkyl group; a ($C_1$-$C_{20}$) alkylamido group; a ($C_6$-$C_{20}$) arylamido group; or a ($C_1$-$C_{20}$) alkylidene group, $A^3$ is a group 14 element, $R^{34}$, $R^{35}$, $R^{36}$, $R^{37}$, and $R^{40}$ are the same or different, and are each independently: hydrogen; a ($C_1$-$C_{20}$) alkyl group unsubstituted or substituted with an acetal group or ether group; a ($C_2$-$C_{20}$) alkenyl group unsubstituted or substituted with an acetal group or ether group; a ($C_6$-$C_{20}$) aryl group unsubstituted or substituted with an acetal group or ether group: a ($C_1$-$C_{20}$) alkyl ($C_6$-$C_{20}$) aryl group unsubstituted or substituted with an acetal group or ether group; a ($C_6$-$C_{20}$) aryl ($C_1$-$C_{20}$) alkyl group unsubstituted or substituted with an acetal group or ether group; or a ($C_1$-$C_{20}$) silyl group unsubstituted or substituted with an acetal group or ether group; a ($C_1$-$C_{20}$) alkoxy group: or a ($C_6$-$C_{20}$) aryloxy group, two or more groups among $R^{34}$, $R^{35}$, $R^{36}$, and $R^{37}$ may form an aliphatic ring or aromatic ring by being bonded to each other, and $R^{38}$ and $R^{39}$ are the same or different, and are each independently: hydrogen: a ($C_1$-$C_{20}$) alkyl group; a ($C_2$-$C_{20}$) alkenyl group; a ($C_2$-$C_{20}$) alkynyl group; a ($C_6$-$C_{20}$) aryl group; a ($C_1$-$C_{20}$) alkyl ($C_6$-$C_{20}$) aryl group; a ($C_6$-$C_{20}$) aryl ($C_1$-$C_{20}$) alkyl group; a ($C_1$-$C_{20}$) alkylamido group; a ($C_6$-$C_{20}$) arylamido group; or a ($C_1$-$C_{20}$) alkylidene group.

Another aspect of the present invention provides a method of producing a polypropylene resin, which includes carrying out a propylene polymerization reaction in the presence of the above-described supported catalyst.

Advantageous Effects

Since a first transition metal compound contributing to the formation of crystalline polypropylene and a second transition metal compound contributing to the formation of rubbery polypropylene are co-supported in a supported catalyst of the present invention, a polypropylene resin in which crystalline polypropylene and rubbery polypropylene are simultaneously formed can be produced with only one propylene polymerization step.

Accordingly, a polypropylene resin having improved impact resistance can be produced by a simple method without an additional process for forming a rubber component. In particular, according to the present invention, a rubbery polymer can be formed in the polypropylene resin without adding other types of monomers, and even when the other types of monomers are added, a rubbery polymer can be produced without an additional gas-phase process for reacting the heterogeneous monomers.

In addition, in the case of a polypropylene resin produced using the supported catalyst, since rubbery polypropylene polymer chains are present in a dispersed state between crystalline polypropylene polymer chains, the rubbery polypropylene is less likely to be liberated from the resin. Accordingly, a fouling problem caused due to the liberation of a rubber component from the polypropylene resin can be eliminated.

Moreover, since the proportion of rubbery polypropylene can be controlled by appropriately adjusting a ratio between the co-supported first and second transition metal compounds, a polypropylene resin having desired properties can be easily obtained.

Best Model

Hereinafter, the present invention will be described in detail.

In the present specification, when it is stated that a part "includes" a particular component, this does not preclude the possibility of including other components, and means that the other components may additionally be included unless specifically stated to the contrary.

In the present specification, the term "substitution" means the replacement of a carbon atom of a compound by a substituent, and the position at which the substitution occurs is not limited as long as it is a position where a hydrogen atom that can be substituted is present, that is, a position that can be substituted with a substituent, and when two or more hydrogen atoms are substituted by two or more substituents, the two or more substituents may be the same or different.

In the present specification, the term "group 4 transition metal" refers to titanium (Ti), zirconium (Zr), or hafnium (Hf).

In the present specification, "halogen group" refers to fluorine (F), chlorine (Cl), bromine (Br), or iodine (1).

In addition, the term "alkyl group" described in the present specification refers to a monovalent linear, branched, or cyclic saturated hydrocarbon group consisting only of carbon and hydrogen atoms and may be a methyl group, an ethyl group, a propyl group, an isopropyl group, a butyl group, an isobutyl group, a t-butyl group, a pentyl group, a hexyl group, an octyl group, a dodecyl group, a cyclopropyl group, a cyclobutyl group, a cyclopentyl group, a cyclohexyl group, a cycloheptyl group, a cyclooctyl group, a cyclononyl group, a cyclodecyl group, or the like, but the present invention is not limited to.

In addition, the term "alkenyl group" described in the present specification refers to a linear or branched hydrocarbon group including one or more carbon-carbon double bonds and may be a methenyl group, an ethenyl group, a propenyl group, a butenyl group, a pentenyl group, a hexenyl group, a heptenyl group, an octenyl group, a nonenyl group, a decenyl group, an undecenyl group, a dodecenyl group, or the like, but the present invention is are not limited thereto.

In addition, the term "alkynyl group" described in the present specification refers to a hydrocarbon group including one or more carbon-carbon triple bonds and may be a methynyl group, an ethynyl group, a propynyl group, a butynyl group, a pentynyl group, a hexynyl group, a heptynyl group, an octynyl group, or the like, but the present invention is not limited to.

In addition, the term "aryl group" described in the present specification refers to an organic group derived from an aromatic hydrocarbon by removal of one hydrogen and includes a monocyclic group or a fused-ring group. Specific examples of the aryl group include a phenyl group, a naphthyl group, a biphenyl group, an anthryl group, a fluorenyl group, a phenanthryl group, a triphenylenyl group, a pyrenyl group, a perylenyl group, a chrysenyl group, a naphthacenyl group, a fluoranthenyl group, and the like, but the present invention is not limited thereto.

In addition, the term "alkylaryl group" described in the present specification refers to an organic group in which one or more hydrogen atoms of an aryl group have been substituted by an alkyl group and may be a methylphenyl group, an ethylphenyl group, a n-propylphenyl group, an isopropylphenyl group, a n-butylphenyl group, an isobutylphenyl group, a t-butylphenyl group, or the like, but the present invention is not limited thereto.

In addition, the term "arylalkyl group" described in the present specification refers to an organic group in which one or more hydrogen atoms of an alkyl group have been substituted by an aryl group and may be a phenylpropyl group, a phenylhexyl group, or the like, but the present invention is not limited thereto.

In the present specification, examples of the "alkylaryl group" and the "arylalkyl group" may be the same as the examples given for the alkyl group and the aryl group in the above, but are not limited thereto.

In addition, as described in the present specification, the term "amido group" refers to an amino group ($-NH_2$) bonded to a carbonyl group (C=O), the term "alkylamido group" refers to an organic group in which one or more hydrogen atoms of $-NH_2$ of an amido group have been substituted by an alkyl group, and the term "arylamido group" refers to an organic group in which one or more hydrogen atoms of $-NH_2$ of an amido group have been substituted by an aryl group. Examples of the alkyl group of the alkylamido group and the aryl group of the arylamido group may be the same as the examples given for the alkyl group and the aryl group in the above, but the present invention is not limited thereto.

In addition, the term "alkylidene group" described in the present specification refers to a divalent aliphatic hydrocarbon group in which two hydrogen atoms have been removed from the same carbon atom of an alkyl group and may be an ethylidene group, a propylidene group, an isopropylidene group, a butylidene group, a pentylidene group, or the like, but the present invention is not limited thereto.

In the present specification, "acetal group" refers to an organic group formed by the bonding between an alcohol and an aldehyde, that is, a substituent having two ether ($-OR$) bonds on one carbon atom and may be a methoxymethoxy group, a 1-methoxyethoxy group, a 1-methoxypropyloxy group, a 1-methoxybutyloxy group, a 1-ethoxyethoxy group, a 1-ethoxypropyloxy group, a 1-ethoxybutyloxy group, a 1-(n-butoxy)ethoxy group, a 1-(isobutoxy)ethoxy group, a 1-(secondary butoxy)ethoxy group, a 1-(tertiary butoxy)ethoxy group, a 1-(cyclohexyloxy)ethoxy group, a 1-methoxy-1-methylmethoxy group, a 1-methoxy-1-methylethoxy group, or the like, but the present invention is not limited thereto.

In the present specification, "ether group" refers to an organic group having one or more ether bonds ($-O-$) and may be a 2-methoxyethyl group, a 2-ethoxyethyl group, a 2-butoxyethyl group, a 2-phenoxyethyl group, a 2-(2-methoxyethoxy)ethyl group, a 3-methoxypropyl group, a 3-butoxypropyl group, a 3-phenoxypropyl group, a 2-methoxy-1-methylethyl group, a 2-methoxy-2-methylethyl group, a 2-methoxyethyl group, a 2-ethoxyethyl group, a 2-butoxyethyl group, a 2-phenoxyethyl group, or the like, but the present invention is not limited thereto.

In the present specification, "silyl group" refers to a $-SiH_3$ radical derived from silane, and one or more hydrogen atoms of the silyl group may be substituted by various organic groups such as an alkyl group, a halogen group, or the like. Specific examples of the silyl group include a trimethylsilyl group, a triethylsilyl group, a t-butyldimethylsilyl group, a vinyldimethylsilyl group, a propyldimethylsilyl group, a triphenylsilyl group, a diphenylsilyl group, a phenylsilyl group, and the like, but the present invention is not limited thereto.

In the present specification, "hydrocarbyl" refers to a monovalent organic radical formed by removing a hydrogen atom from a hydrocarbon group consisting only of carbon and hydrogen atoms, such as an alkyl group, an aryl group, an alkylaryl group, an arylalkyl group, or the like, regardless of the structure, and examples thereof may be the same as the examples given for the organic groups above, but the present invention is not limited thereto.

In the present specification, "alkoxy group" refers to an atomic group formed by bonding an oxygen atom to a linear, branched, or cyclic alkyl group and may be methoxy, ethoxy, n-propoxy, isopropoxy, isopropyloxy, n-butoxy, isobutoxy, t-butoxy, or the like, but the present invention is not limited thereto.

In the present specification, "aryloxy group" refers to an aryl group ($-OAr$) bonded with an oxygen atom and may be phenoxy or the like, but the present invention is not limited thereto.

In the present specification, "group 13 element" refers to boron (B), aluminum (Al), gallium (Ga), indium (In), or thallium (Tl).

In the present specification, "group 14 element" refers to carbon (C), silicon (Si), or germanium (Ge).

In the present specification, when it is stated that two or more groups form a ring by being bonded to each other, it may mean that alkylenes unsubstituted or substituted with a hydrocarbon or hetero ring or alkenylenes unsubstituted or substituted with a hydrocarbon or hetero ring form a ring by being bonded to each other.

In addition, the term "crystalline polypropylene" described in the present specification refers to a propylene homopolymer having crystallinity, which is a polypropylene having regularity in terms of the bonding direction of methyl groups. The term "crystalline polypropylene" is a concept including isotactic polypropylene, in which methyl groups are bonded on only one side of the main chain formed by carbon-carbon bonds, and syndiotactic polypropylene, in which methyl groups are bonded on two opposite sides of the main chain.

In addition, the term "rubber polypropylene" described in the present invention is a concept including a rubbery propylene homopolymer and a rubbery propylene copolymer, and the rubber polypropylene is amorphous and has rubbery properties.

In addition, the term "rubber propylene homopolymer" described in the present invention refers to a polymer having rubbery properties which is obtained by polymerizing only propylene, and has an atactic structure in which methyl groups are irregularly bonded, without having a specific orientation, to the main chain formed by carbon-carbon bonds.

In addition, the term "rubber propylene copolymer" described in the present invention refers to a polymer having rubbery properties which is obtained by copolymerizing propylene and other types of monomers (e.g., ethylene). The rubbery propylene copolymer is a polymer in which the crystalline polypropylene and/or the rubbery propylene homopolymer are/is copolymerized with other types of monomers such that rubbery properties are attained.

The present inventors have found that when a supported catalyst in which a first transition metal compound having a specific chemical structure contributing to the formation of crystalline polypropylene and a second transition metal compound having a specific chemical structure contributing to the formation of rubbery polypropylene are co-supported is used, a polypropylene resin in which crystalline polypropylene and rubbery polypropylene are simultaneously formed with only one propylene polymerization reaction step without degradation of activity due to hybridization of transition metal compounds having different properties can be produced, and thus completed the following invention.

One aspect of the present invention provides a supported catalyst for propylene polymerization, which includes: one or more first transition metal compounds selected from among compounds represented by Chemical Formulas 1 and 2 below; one or more second transition metal compounds selected from among compounds represented by Chemical Formulas 3 and 4 below; and a carrier for co-supporting the first and second transition metal compounds.

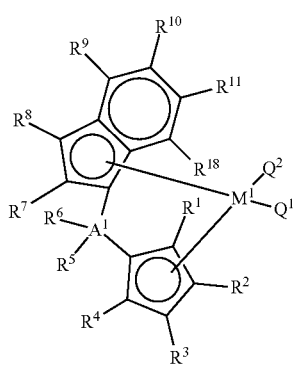

Chemical Formula 1

In Chemical Formula 1, $M^1$ is a group 4 transition metal, $Q^1$ and $Q^2$ are the same or different, and are each independently: a halogen group; a $(C_1-C_{20})$ alkyl group; a $(C_2-C_{20})$ alkenyl group; a $(C_2-C_{20})$ alkynyl group; a $(C_6-C_{20})$ aryl group; a $(C_1-C_{20})$ alkyl $(C_6-C_{20})$ aryl group; a $(C_6-C_{20})$ aryl $(C_1-C_{20})$ alkyl group; a $(C_1-C_{20})$ alkylamido group; a $(C_6-C_{20})$ arylamido group; or a $(C_1-C_{20})$ alkylidene group, $A^1$ is a group 14 element, $R^1$, $R^2$, $R^3$, $R^4$, $R^7$, $R^8$, $R^9$, $R^{10}$, $R^{11}$, and $R^{12}$ are the same or different, and are each independently: hydrogen; a $(C_1-C_{20})$ alkyl group unsubstituted or substituted with an acetal group or ether group; a $(C_2-C_{20})$ alkenyl group unsubstituted or substituted with an acetal group or ether group; a $(C_6-C_{20})$ aryl group unsubstituted or substituted with an acetal group or ether group; a $(C_1-C_{20})$ alkyl $(C_6-C_{20})$ aryl group unsubstituted or substituted with an acetal group or ether group; a $(C_6-C_{20})$ aryl $(C_1-C_{20})$ alkyl group unsubstituted or substituted with an acetal group or ether group; or a $(C_1-C_{20})$ silyl group unsubstituted or substituted with an acetal group or ether group, two or more groups among $R^1$, $R^2$, $R^3$, and $R^4$ may form an aliphatic ring or aromatic ring by being bonded to each other, two or more groups among $R^7$, $R^8$, $R^9$, $R^{10}$, $R^{11}$, and $R^{12}$ may form an aliphatic ring or aromatic ring by being bonded to each other, and $R^5$ and $R^6$ are the same or different, and are each independently: hydrogen; a $(C_1-C_{20})$ alkyl group: a $(C_2-C_{20})$ alkenyl group; a $(C_2-C_{20})$ alkynyl group; a $(C_6-C_{20})$ aryl group; a $(C_1-C_{20})$ alkyl $(C_6-C_{20})$ aryl group: a $(C_6-C_{20})$ aryl $(C_1-C_{20})$ alkyl group; a $(C_1-C_{20})$ alkylamido group; a $(C_6-C_{20})$ arylamido group; or a $(C_1-C_{20})$ alkylidene group,

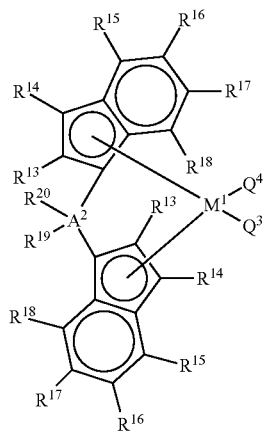

Chemical Formula 2

In Chemical Formula 2, $M^2$ is a group 4 transition metal, $Q^3$ and $Q^4$ are the same or different, and are each independently: a halogen group; a $(C_1-C_{20})$ alkyl group; a $(C_2-C_{20})$ alkenyl group; a $(C_2-C_{20})$ alkynyl group; a $(C_6-C_{20})$ aryl group; a $(C_1-C_{20})$ alkyl $(C_6-C_{20})$ aryl group; a $(C_6-C_{20})$ aryl $(C_1-C_{20})$ alkyl group; a $(C_1-C_{20})$ alkylamido group; a $(C_6-C_{20})$ arylamido group; or a $(C_1-C_{20})$ alkylidene group, $A^2$ is a group 14 element, $R^{13}$, $R^{14}$, R's, $R^{16}$, $R^{17}$, and $R^{18}$ are the same or different, and are each independently: hydrogen; a $(C_1-C_{20})$ alkyl group unsubstituted or substituted with an acetal group or ether group; a $(C_2-C_{20})$ alkenyl group unsubstituted or substituted with an acetal group or ether group; a $(C_6-C_{20})$ aryl group unsubstituted or substituted with an acetal group or ether group; a $(C_1-C_{20})$ alkyl $(C_6-C_{20})$ aryl group unsubstituted or substituted with an acetal group or ether group; a $(C_6-C_{20})$ aryl $(C_1-C_{20})$ alkyl group unsubstituted or substituted with an acetal group or ether group; or a $(C_1-C_{20})$ silyl group unsubstituted or substituted with an acetal group or ether group, two or more groups among $R^{13}$, $R^{14}$, $R^{15}$, $R^{16}$, $R^{17}$, and $R^{18}$ may form an aliphatic ring or aromatic ring by being bonded to each other, and $R^{19}$ and $R^{20}$ are the same or different, and are each independently: hydrogen; a $(C_1-C_{20})$ alkyl group; a $(C_2-C_{20})$ alkenyl group; a $(C_2-C_{20})$ alkynyl group; a $(C_6-C_{20})$ aryl group; a $(C_1-C_{20})$ alkyl $(C_6-C_{20})$ aryl group; a $(C_6-C_{20})$ aryl $(C_1-C_{20})$ alkyl group; a $(C_1-C_{20})$ alkylamido group; a $(C_6-C_{20})$ arylamido group; or a $(C_1-C_{20})$ alkylidene group,

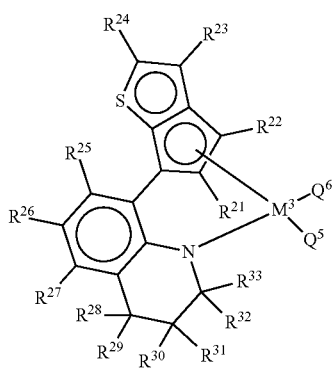

Chemical Formula 3

In Chemical Formula 3, $M^3$ is a group 4 transition metal, $Q^5$ and $Q^6$ are the same or different, and are each independently: a halogen group; a $(C_1\text{-}C_{20})$ alkyl group; a $(C_2\text{-}C_{20})$ alkenyl group; a $(C_2\text{-}C_{20})$ alkynyl group; a $(C_6\text{-}C_{20})$ aryl group; a $(C_1\text{-}C_{20})$ alkyl $(C_6\text{-}C_{20})$ aryl group; a $(C_6\text{-}C_{20})$ aryl $(C_1\text{-}C_{20})$ alkyl group; a $(C_1\text{-}C_{20})$ alkylamido group; a $(C_6\text{-}C_{20})$ arylamido group; or a $(C_1\text{-}C_{20})$ alkylidene group, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, and $R^{33}$ are the same or different, and are each independently: hydrogen; a $(C_1\text{-}C_{20})$ alkyl group unsubstituted or substituted with an acetal group or ether group; a $(C_2\text{-}C_{20})$ alkenyl group unsubstituted or substituted with an acetal group or ether group; a $(C_6\text{-}C_{20})$ aryl group unsubstituted or substituted with an acetal group or ether group; a $(C_1\text{-}C_{20})$ alkyl $(C_6\text{-}C_{20})$ aryl group unsubstituted or substituted with an acetal group or ether group; a $(C_6\text{-}C_{20})$ aryl $(C_1\text{-}C_{20})$ alkyl group unsubstituted or substituted with an acetal group or ether group; or a $(C_1\text{-}C_{20})$ silyl group unsubstituted or substituted with an acetal group or ether group; a $(C_1\text{-}C_{20})$ alkoxy group: or a $(C_6\text{-}C_{20})$ aryloxy group, and two or more groups among $R^{21}$, $R^{22}$, $R^{23}$, $R^{24}$, $R^{25}$, $R^{26}$, and $R^{27}$ may form an aliphatic ring or aromatic ring by being bonded to each other,

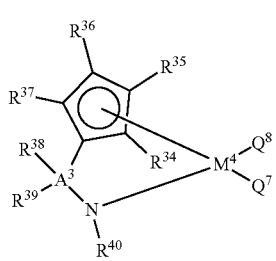

Chemical Formula 4

In Chemical Formula 4, $M^4$ is a group 4 transition metal, $Q^7$ and $Q^8$ are the same or different, and are each independently: a halogen group; a $(C_1\text{-}C_{20})$ alkyl group; a $(C_2\text{-}C_{20})$ alkenyl group; a $(C_2\text{-}C_{20})$ alkynyl group; a $(C_6\text{-}C_{20})$ aryl group; a $(C_1\text{-}C_{20})$ alkyl $(C_6\text{-}C_{20})$ aryl group; a $(C_6\text{-}C_{20})$ aryl $(C_1\text{-}C_{20})$ alkyl group; a $(C_1\text{-}C_{20})$ alkylamido group; a $(C_6\text{-}C_{20})$ arylamido group; or a $(C_1\text{-}C_{20})$ alkylidene group, $A^3$ is a group 14 element, $R^{34}$, $R^{35}$, $R^{36}$, $R^{37}$, and $R^{40}$ are the same or different, and are each independently: hydrogen; a $(C_1\text{-}C_{20})$ alkyl group unsubstituted or substituted with an acetal group or ether group; a $(C_2\text{-}C_{20})$ alkenyl group unsubstituted or substituted with an acetal group or ether group; a $(C_6\text{-}C_{20})$ aryl group unsubstituted or substituted with an acetal group or ether group; a $(C_1\text{-}C_{20})$ alkyl $(C_6\text{-}C_{20})$ aryl group unsubstituted or substituted with an acetal group or ether group; a $(C_6\text{-}C_{20})$ aryl $(C_1\text{-}C_{20})$ alkyl group unsubstituted or substituted with an acetal group or ether group; or a $(C_1\text{-}C_{20})$ silyl group unsubstituted or substituted with an acetal group or ether group; a $(C_1\text{-}C_{20})$ alkoxy group: or a $(C_6\text{-}C_{20})$ aryloxy group, two or more groups among $R^{34}$, $R^{35}$, $R^{36}$, and $R^{37}$ may form an aliphatic ring or aromatic ring by being bonded to each other, and $R^{38}$ and $R^{39}$ are the same or different, and are each independently: hydrogen; a $(C_1\text{-}C_{20})$ alkyl group; a $(C_2\text{-}C_{20})$ alkenyl group; a $(C_2\text{-}C_{20})$ alkynyl group; a $(C_6\text{-}C_{20})$ aryl group; a $(C_1\text{-}C_{20})$ alkyl $(C_6\text{-}C_{20})$ aryl group; a $(C_6\text{-}C_{20})$ aryl $(C_1\text{-}C_{20})$ alkyl group; a $(C_1\text{-}C_{20})$ alkylamido group; a $(C_6\text{-}C_{20})$ arylamido group; or a $(C_1\text{-}C_{20})$ alkylidene group.

First, a first transition metal compound will be described. The first transition metal compound includes one or more selected from among compounds represented by Chemical Formulas 1 and 2.

Specifically, a transition metal compound represented by Chemical Formula 1 has an ansa-metallocene structure in which a cyclopentadienyl ligand and an indenyl ligand are connected to each other by a bridging group including an element in group 14 of the periodic table, and a transition metal compound represented by Chemical Formula 2 has an ansa-metallocene structure in which two indenyl ligands are connected to each other by a bridging group including an element in group 14 of the periodic table.

According to one exemplary embodiment of the present invention, $R^9$ and $R^{15}$ may each independently be: a $(C_6\text{-}C_{20})$ aryl group unsubstituted or substituted with an acetal group or ether group; or a $(C_1\text{-}C_{20})$ alkyl $(C_6\text{-}C_{20})$ aryl group unsubstituted or substituted with an acetal group or ether group. $R^9$ and $R^{15}$ correspond to substituents substituted at a fourth position of indenyl ligands included in the transition metal compounds of Chemical Formulas 1 and 2, respectively, and a transition metal compound including an indenyl ligand substituted with an aryl group or alkylaryl group at the fourth position as such has excellent catalytic activity and thus can be preferably used as a catalyst component for propylene polymerization. In particular, the aryl group or alkylaryl group substituted at the fourth position of the indenyl ligand not only has the advantage of increasing catalytic activity and the molecular weight of polypropylene, but also causes steric hindrance in a propylene polymerization process and thus controls the insertion position and direction of propylene. Accordingly, crystalline polypropylene having high stereoregularity can be produced.

Meanwhile, a second transition metal compound is a catalyst constituent that contributes to the formation of rubbery polypropylene, and includes one or more selected from among compounds represented by Chemical Formulas 3 and 4.

Specifically, in a transition metal compound represented by Formula 3, an amido ligand and an ortho-phenylene form a condensed ring, and a ligand having a structure in which a pentagonal pi-ligand bonded to the ortho-phenylene is fused by a thiophene hetero ring is included. In addition, a transition metal compound represented by Chemical Formula 4 is a metallocene compound that includes a cyclopentadienyl ligand and an amine derivative ligand connected to each other by a bridging group including an element in group 14 of the periodic table. Since the chemical structures of the transition metal compounds do not cause significant steric hindrance during the polymerization of propylene, it is highly likely that in polypropylene produced using a catalyst including such a transition metal compound, methyl groups are irregularly bonded to the main chain without having a specific orientation.

Therefore, when a catalyst including the transition metal compound is used, polypropylene having an atactic structure exhibiting rubbery properties, that is, rubbery polypropylene, can be produced. In addition, when copolymerization is carried out in the propylene polymerization process by additionally adding other types of monomers such as ethylene, since the reactivity between the second transition metal compound and ethylene is excellent, the proportion of a rubbery propylene copolymer may increase, and accordingly, the glass transition temperature (Tg) of a rubber phase may be lowered, and thus properties can be improved.

According to one exemplary embodiment of the present invention, $A^1$, $A^2$, and $A^3$ may each independently be carbon (C) or silicon (Si), and $R^5$, $R^6$, $R^{19}$, $R^{20}$, $R^{38}$, and $R^{39}$ may each independently be hydrogen or a methyl group. In Chemical Formulas 1, 2, and 4, each of $-A^1R^5R^6$, $-A^2R^{19}R^{20}$, and $-A^3R^{38}R^{39}$ functions as a bridge between two ligands, and since the two ligands are linked by $A^1R^5R^6$, $-A^2R^{19}R^{20}$, or $-A^3R^{38}$, $R^{39}$, excellent stability is attained.

According to one exemplary embodiment of the present invention, $Q^1$, $Q^2$, $Q^3$, $Q^4$, $Q^5$, $Q^6$, $Q^7$, and $Q^8$ may each independently be: a halogen group selected from among F, Cl, Br, and I; a methyl group; or an ethyl group. Here, the methyl group and the ethyl group may be unsubstituted or substituted with an acetal group or ether group. In addition, in the transition metal compounds represented by Chemical Formulas 1 to 4, $M^1$, $M^2$, $M^3$, and $M^4$ bonded to each of $Q^1Q^2$, $Q^3Q^4$, $Q^5Q^6$, and $Q^7Q^8$ are each independently: Ti, Zr, or Hf; Zr or Hf; or Zr.

According to one exemplary embodiment of the present invention, the compound represented by Chemical Formula 1 may be any one of compounds represented by Chemical Formulas 1-1 to 1-6 below, the compound represented by Chemical Formula 2 may be any one of compounds represented by Chemical Formulas 2-1 to 2-6 below, the compound represented by Chemical Formula 3 may be any one of compounds represented by Chemical Formulas 3-1 to 3-8 below, and the compound represented by Chemical Formula 4 may be any one of compounds represented by Chemical Formulas 4-1 to 4-6 below.

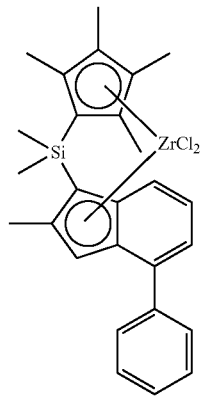

Chemical Formula 1-1

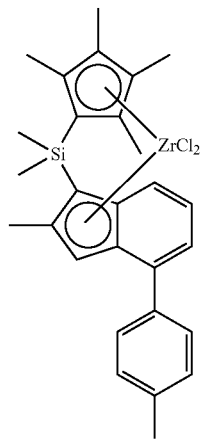

Chemical Formula 1-2

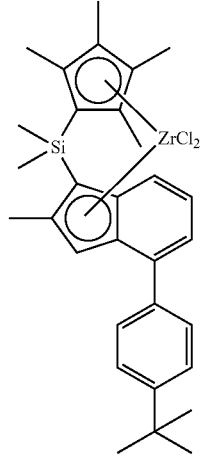

Chemical Formula 1-3

Chemical Formula 1-4
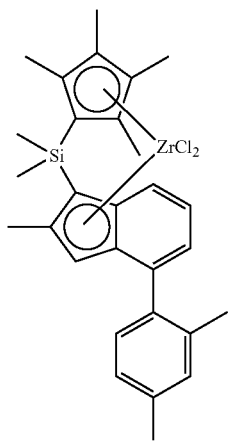
Chemical Formula 1-5
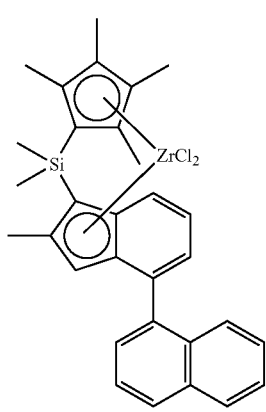
Chemical Formula 1-6
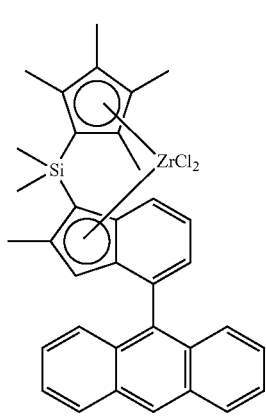
Chemical Formula 2-1
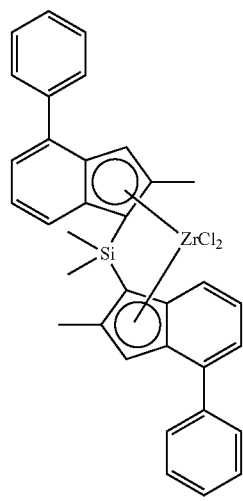
Chemical Formula 2-2

Chemical Formula 2-3
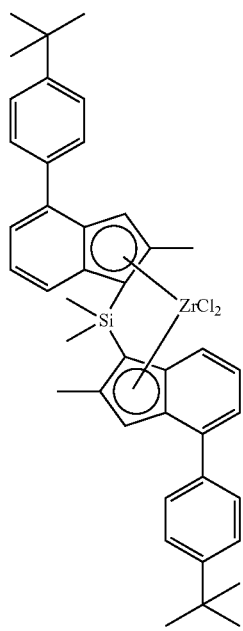
Chemical Formula 2-5
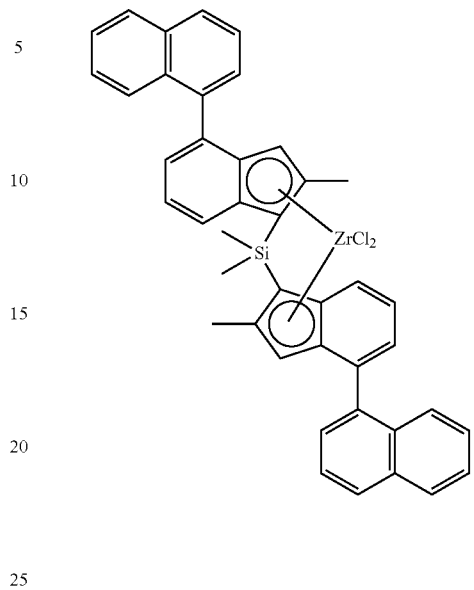
Chemcial Formula 2-6
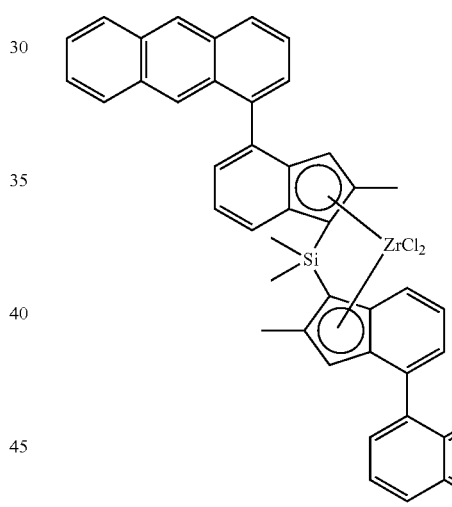
Chemical Formula 2-4
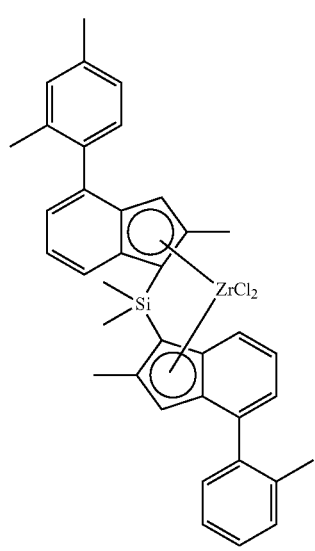
Chemical Formula 3-1
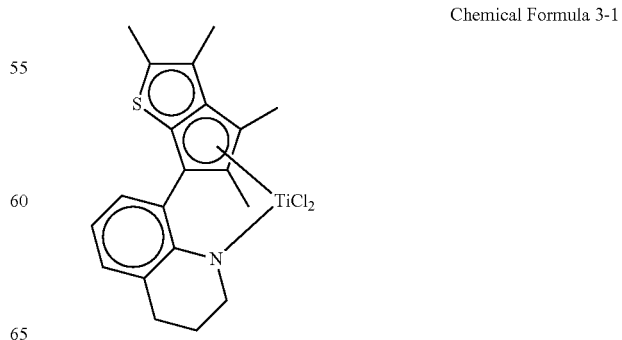

Chemical Formula 3-2
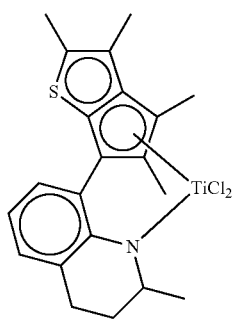
Chemical Formula 3-3
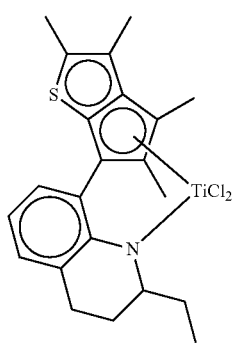
Chemical Formula 3-4
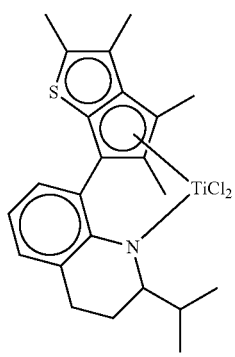
Chemical Formula 3-5
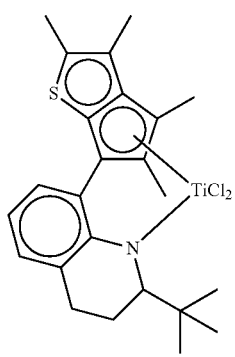
Chemical Formula 3-6
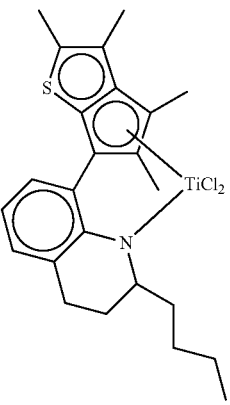
Chemical Formula 3-7
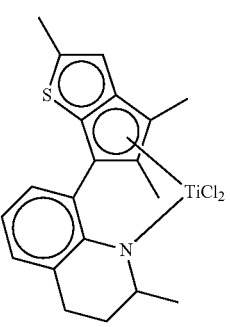
Chemical Formula 3-8
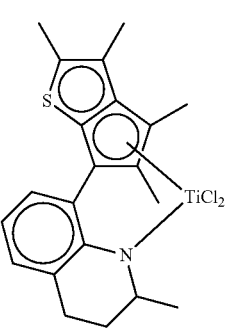
Chemical Formula 4-1
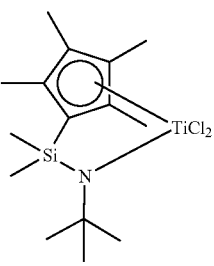
Chemical Formula 4-2
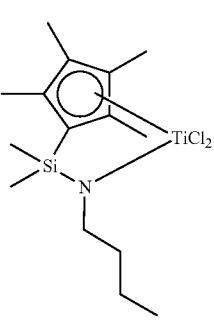

-continued

Chemical Formula 4-3

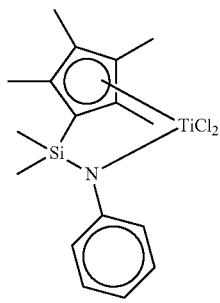

Chemical Formula 4-4

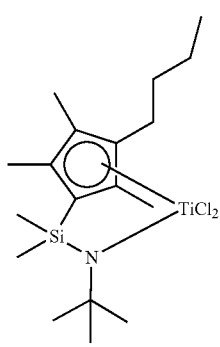

Chemical Formula 4-5

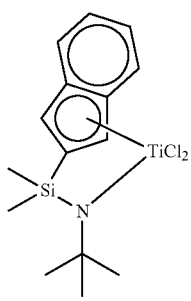

Chemical Formula 4-6

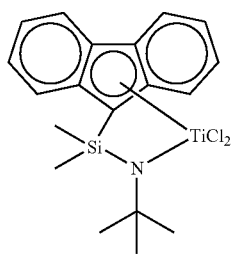

When the first and second transition metal compounds are co-supported according to the present invention, even though transition metal compounds having different properties are co-supported, none of the transition metal compounds degrades the activity of the other, and thus a supported catalyst having high activity can be provided. When propylene is polymerized using this supported catalyst, a polypropylene resin in which crystalline polypropylene and rubbery polypropylene are simultaneously formed can be produced with only one polymerization reaction step. In addition, the proportion of rubbery polypropylene in the polypropylene resin can be controlled by adjusting a ratio between the co-supported first transition metal compound and second transition metal compound. Therefore, it is possible to provide a polypropylene resin having desired properties by adjusting the ratio between the co-supported transition metal compounds.

According to one exemplary embodiment of the present invention, the first transition metal compound and the second transition metal compound may be included in a molar ratio of 50:50 to 10:99. When a supported catalyst includes the first and second transition metal compounds in the above molar ratio, a polypropylene resin with excellent impact resistance and high rigidity due to including rubbery polypropylene in an appropriate proportion can be produced.

According to one exemplary embodiment of the present invention, the supported catalyst may additionally include one or more cocatalyst compounds selected from the group consisting of a compound having a unit represented by Chemical Formula 5 below, a compound represented by Chemical Formula 6 below, and a compound represented by Chemical Formula 7 below.

Chemical Formula 5

$$-[Al(Ra)-O]_n-$$

In Chemical Formula 5,
n is an integer of 2 or more,
Al is aluminum,
O is oxygen, and
Ra is: a halogen group; or a ($C_1$-$C_{20}$) hydrocarbyl group unsubstituted or substituted with a halogen group, Chemical Formula 6

$$Q(Rb)_3$$

In Chemical Formula 6,
Q is: aluminum; or boron, and
Rbs are the same or different, and are each independently: a halogen group; or a ($C_1$-$C_{20}$) hydrocarbyl group unsubstituted or substituted with a halogen group, Chemical Formula 7

$$[W]^+[Z(Rc)_4]^-$$

In Chemical Formula 7,
$[W]^+$ is: a cationic Lewis acid; or a cationic Lewis acid to which a hydrogen atom is bonded,
Z is a group 13 element, and
Rcs are the same or different, and are each independently: a ($C_6$-$C_{20}$) aryl group substituted with one or more substituents selected from the group consisting of a halogen group, a ($C_1$-$C_{20}$) hydrocarbyl group, an alkoxy group, and a phenoxy group; or a ($C_1$-$C_{20}$) alkyl group substituted with one or more substituents selected from the group consisting of a halogen group, a ($C_1$-$C_{20}$) hydrocarbyl group, an alkoxy group, and a phenoxy group.

The cocatalyst compound is included in a catalyst composition along with the transition metal compound and serves to activate the transition metal compound. Specifically, to help the transition metal compound become an active catalyst component applicable to the polymerization of propylene, a compound having the unit represented by Chemical Formula 5 which is capable of extracting ligands ($Q^1Q^2$) from the transition metal compound and thus cationizing the central metal (M), and is capable of functioning as a counterion (i.e., anion) having weak bonding strength, the compound represented by Chemical Formula 6, and the compound represented by Chemical Formula 7 work, as cocatalysts, with the transition metal compound.

The compound having the "unit" represented by Chemical Formula 5 has a structure in which a structure enclosed in [ ] is connected n times in the compound, and as long as the compound includes the unit represented by Chemical Formula 5, the structure of the remaining part of the compound is not particularly limited, and the compound may have a cluster form in which repeat units represented by Chemical Formula 5 are connected, and for example, the compound may be a spherical compound.

The compound having the unit represented by Chemical Formula 5 is not particularly limited, and may be specifically alkylaluminoxane. Non-limiting examples of the compound include methylaluminoxane, ethylaluminoxane, isobutylaluminoxane, butylaluminoxane, and the like. In consideration of the activity of the transition metal compound, methylaluminoxane may be used.

In addition, the compound represented by Formula 6 is an alkyl metal compound and is not particularly limited, and non-limiting examples thereof include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethyl boron, triethyl boron, triisobutyl boron, tripropyl boron, tributyl boron, and the like. In consideration of the activity of the transition metal compound, one or more selected from the group consisting of trimethylaluminum, triethylaluminum, and triisobutylaluminum may be used.

In the compound represented by Chemical Formula 7, in consideration of the activity of the transition metal compound, when $[W]^+$ is a cationic Lewis acid to which a hydrogen atom is bonded, $[W]^+$ may be a dimethylanilinium cation, and when $[W]^+$ is a cationic Lewis acid, $[W]^+$ may be $[(C_6H_5)_3C]^+$, and $[Z(Rc)_4]^-$ may be $[B(C_6F_5)_4]^-$.

The compound represented by Chemical Formula 7 is not particularly limited, and when $[W]^+$ is a cationic Lewis acid to which a hydrogen atom is bonded, non-limiting examples of the compound include triethylammonium tetrakisphenylborate, tributylammonium tetrakisphenylborate, trimethylammonium tetrakisphenylborate, tripropylammonium tetrakisphenylborate, trimethylammonium tetrakis(p-tolyl)borate, tripropylammonium tetrakis(p-tolyl)borate, trimethylammonium tetrakis(o,p-dimethylphenyl)borate, triethylammonium tetrakis(o,p-dimethylphenyl)borate, tributylammonium tetrakis(p-trifluoromethylphenyl)borate, trimethylammonium tetrakis(p-trifluoromethylphenyl)borate, tributylammonium tetrakispentafluorophenylborate, anilinium tetrakisphenylborate, anilinium tetrakis(pentafluorophenyl)borate, N,N-dimethylanilinium tetrakis(pentafluorophenyl)borate, N,N-diethylanilinium tetrakisphenylborate, N,N-diethylanilinium tetrakisphenylborate, N,N-diethylanilinium tetrakispentafluorophenylborate, diethylammonium tetrakispentafluorophenylborate, triphenylphosphonium tetrakisphenylborate, trimethylphosphonium tetrakisphenylborate, triphenylcarbonium tetrakis(p-trifluoromethylphenyl)borate, triphenylcarbonium tetrakispentafluorophenylborate, dimethylanilinium tetrakis(pentafluorophenyl)borate, and the like, and when $[W]^+$ is a cationic Lewis acid, non-limiting examples of the compound include triphenylcarbonium tetrakisphenylborate, triphenylcarbonium tetrakis(p-tolyl)borate, triphenylcarbonium tetrakis(o,p-dimethylphenyl)borate, triphenylcarbonium tetrakis(p-trifluoromethylphenyl)borate, triphenylcarbonium tetrakispentafluorophenylborate, triphenylcarbonium tetrakis(pentafluorophenyl)borate, and the like.

As a carrier for co-supporting the first and second transition metal compounds, any inorganic or organic carrier used in the production of a catalyst in the technical field to which the present invention pertains may be used without limitation, and for example, $SiO_2$, $Al_2O_3$, $MgO$, $MgCl_2$, $CaCl_2$), $ZrO_2$, $TiO_2$, $B_2O_3$, $CaO$, $ZnO$, $BaO$, $ThO_2$, $SiO_2$—$Al_2O_3$, $SiO_2$—$MgO$, $SiO_2$—$TiO_2$, $SiO_2$—$V_2O_5$, $SiO_2$—$CrO_2O_3$, $SiO_2$—$TiO_2$—$MgO$, bauxite, zeolite, starch, cyclodextrin, a synthetic polymer, or the like may be used. Specifically, the carrier includes a hydroxyl group on its surface and may be one or more carriers selected from the group consisting of silica, silica-alumina, and silica-magnesia.

As a method of supporting the above-described transition metal compounds and the cocatalyst compound on the carrier, a method of directly supporting the transition metal compounds and the cocatalyst compound on the carrier, which is in a dehydrated state, a method of primarily treating the carrier with the cocatalyst compound and then supporting the transition metal compound, a method of supporting the transition metal compound on the carrier and then secondarily treating with the cocatalyst compound, a method of reacting the transition metal compound with the cocatalyst compound and then carrying out a reaction by adding the carrier, or the like may be used.

A solvent used in the method of supporting the transition metal compounds and the cocatalyst compound on the carrier may be an aliphatic hydrocarbon-based solvent, an aromatic hydrocarbon-based solvent, a halogenated aliphatic hydrocarbon-based solvent, or a combination thereof. Here, non-limiting examples of the aliphatic hydrocarbon-based solvent include pentane, hexane, heptane, octane, nonane, decane, undecane, dodecane, and the like. In addition, non-limiting examples of the aromatic hydrocarbon-based solvent include benzene, monochlorobenzene, dichlorobenzene, trichlorobenzene, toluene, and the like. In addition, non-limiting examples of the halogenated aliphatic hydrocarbon-based solvent include dichloromethane, trichloromethane, dichloroethane, trichloroethane, and the like.

In addition, a process of supporting the transition metal compounds and the cocatalyst compound on the carrier may be carried out at a temperature of −70° C. or more and 200° C. or less, and specifically, it is advantageous in terms of the efficiency of the process of supporting the compounds on the carrier that the process is carried out at a temperature of −50° C. or more and 150° C. or less or at a temperature of 0° C. or more and 100° C. or less. Another aspect of the present invention provides a method of producing a polypropylene resin, which includes carrying out a propylene polymerization reaction in the presence of the above-described supported catalyst.

According to one exemplary embodiment of the present invention, crystalline polypropylene and rubbery polypropylene are simultaneously formed by the above-described polymerization reaction. This is made possible due to the use of a supported catalyst in which a first transition metal compound contributing to the formation of crystalline polypropylene and a second transition metal compound contributing to the formation of rubbery polypropylene are co-supported, and when the supported catalyst is used, the above-described two polypropylene forms can be simultaneously formed by one polymerization reaction step.

According to one exemplary embodiment of the present invention, the rubbery polypropylene may include one or more selected from the group consisting of: a rubbery propylene homopolymer; and a rubbery propylene copolymer polymerized by additionally adding other types of monomers in the propylene polymerization step. The other types of monomers are added along with propylene in the process of producing a polypropylene resin, and in the present invention, an additional process required due to the addition of the other types of monomers, for example, an additional process such as a gas-phase process conventionally carried out after propylene polymerization in order to produce a rubber component, is not required. That is, according to the present invention, a rubbery propylene homopolymer and/or a rubbery propylene copolymer can be formed simultaneously with crystalline polypropylene by only one step of polymerizing propylene alone or copolymerizing propylene with other types of monomers in the presence of the supported catalyst.

According to one exemplary embodiment of the present invention, the other types of monomers may include one or more selected from the group consisting of ethylene, butene, hexene, and octene, and, in consideration of reactivity with the second transition metal compound, ethylene may be used.

According to one exemplary embodiment of the present invention, the rubbery polypropylene may be included in an amount of 5% or more and 30% or less based on the total weight of the polypropylene resin, and in this case, a polypropylene resin having high rigidity and excellent impact strength can be provided. The proportion of the rubbery polypropylene can be controlled by adjusting a ratio between the co-supported first and second transition metal compounds, and by appropriately adjusting the ratio between the co-supported transition metal compounds, a polypropylene resin with a suitable proportion of rubbery polypropylene for its intended use can be easily produced.

According to one exemplary embodiment of the present invention, the polymerization may be performed in a phase selected from the group consisting of a liquid phase, a bulk phase, and a slurry phase, and gas-phase polymerization is not included among the propylene polymerization methods of the present invention. When the polymerization reaction is carried out in a liquid or slurry phase, a solvent or a propylene monomer itself may be used as a medium.

A solvent usable in the polymerization reaction may be: an aliphatic hydrocarbon solvent such as butane, isobutane, pentane, hexane, heptane, octane, nonane, decane, undecane, dodecane, cyclopentane, methylcyclopentane, cyclohexane, or the like; an aromatic hydrocarbon solvent such as benzene, monochlorobenzene, dichlorobenzene, trichlorobenzene, toluene, xylene, chlorobenzene, or the like; a halogenated aliphatic hydrocarbon solvent such as dichloromethane, trichloromethane, chloroethane, dichloroethane, trichloroethane, 1,2-dichloroethane, or the like; or a combination thereof.

In this case, the usage amount of the supported catalyst can be determined within a range in which a polymerization reaction of monomers can sufficiently occur in a slurry-, liquid-, or bulk-phase process, and thus is not particularly limited. However, in consideration of the activity of the supported catalyst, the addition amount of the catalyst may be $10^{-8}$ mol/L or more and 1 mol/L or less, and specifically $10^{-7}$ mon/L or more and $10^{-1}$ mol/L or less, or $10^{-7}$ mol/L or more and $10^{-2}$ mol/L or less, based on the concentration of the central metal (M) of a metallocene compound included in the supported catalyst per unit volume (L) of a propylene monomer.

The polymerization reaction may be carried out as a batch type reaction, a semi-continuous type reaction, or a continuous type reaction.

In this case, the temperature and pressure conditions for polymerization are not particularly limited and may be determined in consideration of the efficiency of the polymerization reaction according to the types of reaction and reactor to be applied. The polymerization temperature may be 40° C. or more and 150° C. or less, and specifically 60° C. or more and 100° C. or less. The polymerization reaction pressure may be 1 atm or more and 100 atm or less, and specifically 5 atm or more and 50 atm or less.

Hereinafter, the present invention will be described in detail by way of examples.

Except where otherwise indicated, all ligand and catalyst synthesis experiments were performed under a nitrogen atmosphere by using standard Schlenk and glovebox techniques, and all the organic solvents used in reactions were refluxed under sodium metal and benzophenone to remove moisture and were distilled immediately before use. The $^1$H-NMR analysis of the synthesized ligand and catalyst was performed at room temperature using Bruker 300 MHz.

n-hexane, which is a polymerization solvent, was used after being passed through a tube filled with molecular sieve 5A and activated alumina and being subjected to bubbling with high-purity nitrogen to sufficiently remove moisture, oxygen, and miscellaneous types of catalyst poison. All polymerization reactions were carried out, in an autoclave that was completely isolated from the outside atmosphere, after injecting the required amounts of solvent, cocatalyst, monomers to be polymerized, and the like and adding a catalyst. A polymerized polypropylene resin was analyzed as follows.

Preparation Example 1: Synthesis of Transition Metal Compound (tetramethylcyclopentadienyl dimethylsilyl 2-methyl-4-(4-t-butylphenyl)indenylzirconium dichloride

[Step 1: Synthesis of dimethyl tetramethylcyclopentadienyl chlorosilane]

After inputting 600 ml of tetrahydrofuran and 50 g of tetramethylcyclopentadiene into a 2 L flask and slowly adding 170 ml of n-butyllithium (n-BuLi, 2.5 M solution in hexane) dropwise under the conditions of a nitrogen atmosphere and a temperature of −10° C., a reaction was carried out at room temperature for 12 hours while stirring, and thus a reaction solution was obtained. After lowering the temperature of the reaction solution back to −10° C. and then adding 170 g of dimethyl dichlorosilane, a reaction was carried out at room temperature for 12 hours while stirring, and as a result of subsequently drying the resultant under vacuum, a solid reaction product was obtained. The solid reaction product was dissolved by adding 500 ml of n-hexane and then filtered through a Celite filter, and the filtered solution was dried under vacuum, and thereby 70 g of dimethyl tetramethylcyclopentadienyl chlorosilane in a yellow oil form was obtained (yield: 80%).

$^1$H-NMR (300 MHz, CDCl$_3$) δ 0.235 (s, 6H), 1.81 (s, 6H), 1.97 (s, 6H), 3.07 (s, 1H) [Step 2: Synthesis of dimethyl tetramethylcyclopentadienyl 2-methyl-4-(4-t-butylphenyl) indenyl silane]

After lowering the temperature of a flask containing 200 ml of toluene, 40 ml of tetrahydrofuran, and 50 g of 2-methyl-4-(4-t-butylphenyl)indene to −10° C., 76 ml of n-BuLi (2.5 M solution in hexane) was slowly added dropwise to the flask, and as a result of subsequently stirring at room temperature for 12 hours, a reaction solution was obtained. After lowering the temperature of the reaction solution back to −10° C., 38 g of dimethyl tetramethylcyclopentadienyl chlorosilane synthesized in Step 1 was added, and a reaction was carried out at room temperature for 12 hours while stirring. When the reaction was completed, 400 ml of water was added and again stirred at room temperature for 1.5 hours, and as a result of extracting with toluene and drying under vacuum, 80 g of dimethyl tetramethylcyclopentadienyl 2-methyl-4-(4-t-butylphenyl)indenyl silane was obtained (yield: 95%).

$^1$H-NMR (300 MHz, CDCl$_3$) δ0.2-0.23 (d, 6H), 1.44 (s, 9H), 1.91 (s, 6H), 2.05-2.08 (d, 6H), 2.29 (s, 3H), 2.41 (s, 1H), 3.76 (s, 1H), 6.87 (s, 1H)

[Step 3: Synthesis of tetramethylcyclopentadienyl dimethylsilyl 2-methyl-4-(4-t-butylphenyl)indenylzirconium dichloride]

After inputting 50 g of the dimethyl tetramethylcyclopentadienyl 2-methyl-4-(4-t-butylphenyl)indenyl silane synthesized in Step 2, 300 ml of toluene, and 100 ml of diethyl ether into a flask and lowering the temperature of to −10° C., 90 ml of n-BuLi (2.5 M solution in hexane) was slowly added dropwise. After the dropwise addition was completed, a reaction temperature was raised to room temperature and stirring was performed for 48 hours, and subsequently, filtration was performed. As a result of drying the obtained filtrate under vacuum, 40 g of a solid tetramethylcyclopentadienyl dimethylsilyl 2-methyl-4-(4-t-butylphenyl)indenyl dilithium salt was obtained (yield: 80%), and the salt was used in a subsequent reaction without purification.

40 g of the tetramethylcyclopentadienyl dimethylsilyl 2-methyl-4-(4-t-butylphenyl)indenyl dilithium salt, 40 ml of toluene, and 10 ml of ether were input into Flask #1 and stirred. In Flask #2, a mixture of 30 ml of toluene and 20 g of ZrCl$_4$ was prepared. The mixture solution of Flask #2 was slowly added dropwise to Flask #1 using a cannula and then stirred at room temperature for 24 hours. After stirring was completed, the resultant was dried under vacuum, extracted with 500 ml of methylene chloride, and filtered through a Celite filter, and the filtrate was dried under vacuum. A solid obtained by vacuum-drying was washed with 50 ml of a mixture of methylene chloride and n-hexane (volume ratio=1:3) and then dried under vacuum, and thereby 32 g of tetramethylcyclopentadienyl dimethylsilyl 2-methyl-4-(4-t-butylphenyl)indenyl zirconium dichloride (hereinafter referred to as "Transition metal compound-1") in a yellow solid form was obtained (yield: 60%). The chemical structure of Transition metal compound-1 is shown in Table 1 below.

$^1$H-NMR (300 MHz, CDCl$_3$) δ 1.09 (s, 3H), 1.202 (s, 3H), 1.346 (s, 9H), 1.887-1.911(d, 6H), 1.989 (s, 3H), 2.075 (s, 3H), 2.278 (s, 3H), 7.0-7.628 (m, 8H)

Preparation Example 2: Provision of Transition Metal Compound ((dimethylsilylene)bis(2-methyl-4-phenylindenyl)zirconium dichloride (Dimethylsilylene)bis(2-methyl-4-phenylindenyl)zirconium dichloride commercially obtained from S-PCI Inc. was provided as "Transition metal compound-2." The chemical structure of Transition metal compound-2 is shown in Table 1 below.

Preparation Example 3: Synthesis of transition metal compound (2-methyl-3-H-4,5-dimethyl-6-(2-methyl-2,3,4,5-tetrahydroquinolin-8-yl)-4H-cyclopentathiophene titanium dichloride A transition metal compound was synthesized according to Reaction Scheme 1 below. Details of the synthesis process are as follows.

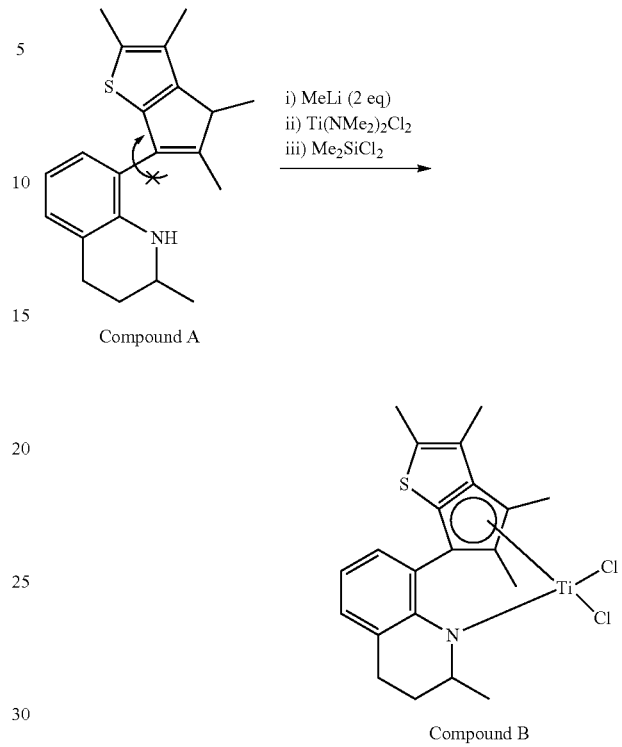

Reaction Scheme 1 i) MeLi (2 eq)
ii) Ti(NMe$_2$)$_2$Cl$_2$
iii) Me$_2$SiCl$_2$

Compound A

Compound B

At −30° C., 1.63 g of methyllithium (3.55 mmol, 1.6 M solution in diethyl ether) was added dropwise to 10 mL of a solution in which 0.58 g of Compound A (1.79 mmol) (manufactured by LOTTE Chemical Corporation) was dissolved in diethyl ether, and thereby a mixed solution was obtained. After stirring the obtained mixed solution overnight at room temperature, the temperature was lowered to −30° C., and 0.37 g of Ti(NMe$_2$)$_2$Cl$_2$ (1.79 mmol) was added. After adding Ti(NMe$_2$)$_2$C$_{12}$, the solution was stirred for three hours, and then all the solvent was removed using a vacuum pump, and thus a solid reaction product was obtained. The obtained solid reaction product was dissolved in toluene (8 mL), and to this solution, 1.16 g of Me$_2$SiCl$_2$ (8.96 mmol) was subsequently added. After adding Me$_2$SiCl$_2$, the solution was stirred at 80° C. for three days, and then the solvent was removed using a vacuum pump, and thus Compound B (2-methyl-3H-4,5-dimethyl-6-(2-methyl-2,3,4,5-tetrahydroquinolin-8-yl)-4H-cyclopentathiophene titanium dichloride (hereinafter referred to as "Transition metal compound-3") in a red solid form was obtained (0.59 g, yield: 75%). The chemical structure of Transition metal compound-3 is shown in Table 1 below.

Preparation Example 4: Provision of Transition Metal Compound (Dimethylsilyl(t-Butylamido)(Tetramethylcyclopentadienyl)Titanium dichloride Dimethylsilyl(t-butylamido)(tetramethylcyclopentadienyl)titanium dichloride commercially obtained from S-PCI Inc. was provided as "Transition metal compound-4." The chemical structure of Transition metal compound-4 is shown in Table 1 below.

TABLE 1

| Transition metal compound-1 | Transition metal compound-2 | Transition metal compound-3 | Transition metal compound-4 |
|---|---|---|---|
| (structure) | (structure) | (structure) | (structure) |

In Table 1, Transition metal compound-I (Preparation Example 1) and Transition metal compound-2 (Preparation Example 2) are first transition metal compounds, and Transition metal compound-3 (Preparation Example 3) and Transition metal compound-4 (Preparation Example 4) are second transition metal compounds.

Preparation Example 5: Preparation of Supported Catalyst (Transition Metal Compound-1+ Transition Metal Compound-3

2.0 g of silica (manufacturer: W. R. Grace & Co.-Conn., product name: XPO-2412) was input into a Schlenk flask (100 ml) in a glovebox, and 10 ml of an anhydrous toluene solution was added. To this, 10.2 ml of methylaluminoxane (as a 10 wt % methylaluminoxane solution in toluene; 15 mmol based on the amount of Al; manufacturer: W. R. Grace & Co.-Conn.) was slowly added dropwise at 10° C., stirred at 0° C. for about one hour, heated to 70° C. and stirred for three hours, and then cooled to 25° C.

Separately, 20 μmol of the synthesized Transition metal compound-1 and 80 μmol of Transition metal compound-3 were input into another 100 ml Schlenk flask in a glovebox, and after taking the flask out of the glovebox, 10 ml of an anhydrous toluene solution was added.

Subsequently, the solution containing Transition metal compound-1 and Transition metal compound-3 was slowly added to a solution containing silica and methylaluminoxane at 10° C., heated to 70° C. and stirred for one hour, and then cooled to 25° C. and stirred for 24 hours. Subsequently, the obtained reaction product was washed with a sufficient amount of toluene and hexane to remove an unreacted aluminum compound. Subsequently, the resultant was dried under vacuum, and thereby Supported catalyst-1 was obtained.

Preparation Examples 6 to 15: Preparation of Supported Catalyst

Supported catalysts were prepared in the same manner as in Preparation Example 5 except that different types of transition metal compounds were used, instead of Transition metal compound-1 and Transition metal compound-3, in the amounts adjusted as shown in Table 2 below. The names of the individual supported catalysts are shown in Table 2 below.

TABLE 2

| | | First transition metal compound | | Second transition metal compound | |
|---|---|---|---|---|---|
| | Name of supported catalyst | Transition metal compound-1 (μmol) | Transition metal compound-2 (μmol) | Transition metal compound-3 (μmol) | Transition metal compound-4 (μmol) |
| Preparation Example 5 | Supported catalyst-1 | 20 | — | 80 | — |
| Preparation Example 6 | Supported catalyst-2 | 10 | — | 90 | — |
| Preparation Example 7 | Supported catalyst-3 | 20 | — | — | 80 |
| Preparation Example 8 | Supported catalyst-4 | 10 | — | — | 90 |
| Preparation Example 9 | Supported catalyst-5 | — | 20 | 80 | — |
| Preparation Example 10 | Supported catalyst-6 | — | 10 | 90 | — |

TABLE 2-continued

|  |  | First transition metal compound | | Second transition metal compound | |
| --- | --- | --- | --- | --- | --- |
|  | Name of supported catalyst | Transition metal compound-1 (μmol) | Transition metal compound-2 (μmol) | Transition metal compound-3 (μmol) | Transition metal compound-4 (μmol) |
| Preparation Example 11 | Supported catalyst-7 | — | 20 | — | 80 |
| Preparation Example 12 | Supported catalyst-8 | — | 10 | — | 90 |
| Preparation Example 13 | Supported catalyst-9 | 100 | — | — | — |
| Preparation Example 14 | Supported catalyst-10 | — | 100 | — | — |
| Preparation Example 15 | Supported catalyst-11 | — | — | 100 | — |
| Preparation Example 16 | Supported catalyst-12 | — | — | — | 100 |

Example 1: Preparation of Polypropylene Resin

At room temperature, the interior of a stainless steel autoclave (high-pressure reactor) having an internal capacity of 2 L was completely substituted with nitrogen. After injecting 2 ml of triisobutylaluminum (as a 1 M solution in hexane), 500 g of propylene, and 15 g of ethylene into the reactor while maintaining nitrogen purging, a dispersion prepared by dispersing 50 mg of Supported catalyst-1 in 5 ml of hexane was added into the reactor using high pressure nitrogen. Subsequently, polymerization was carried out at 70° C. for 60 minutes. After polymerization was completed, the reactor was cooled to room temperature, and as a result of subsequently removing unreacted propylene and ethylene through a discharge line, a white powdery solid was obtained. The obtained white powdery solid was dried for 15 hours or more while heating at 80° C. using a vacuum oven, and thereby a final polypropylene resin was obtained.

Examples 2 to 16 and Comparative Example 6: Preparation of Polypropylene Resin

Propylene resins were produced in the same manner as in Example 1 except that a propylene loading amount (PL), an ethylene loading amount (EL), and a supported catalyst type were adjusted as shown in Table 3 below.

Comparative Example 1: Preparation of Polypropylene Resin

Polypropylene was produced in the same manner as in Example 1 except that 10 mg of Supported catalyst-9 and 40 mg of Supported catalyst-11 (weight ratio of Supported catalyst-9 and Supported catalyst-11=2:8) instead of 50 mg of Supported catalyst-1 were dispersed in hexane.

Comparative Example 2: Preparation of Polypropylene Resin

Polypropylene was produced in the same manner as in Example 1 except that 10 mg of Supported catalyst-9 and 40 mg of Supported catalyst-12 (weight ratio of Supported catalyst-9 and Supported catalyst-12=2:8) instead of 50 mg of Supported catalyst-1 were dispersed in hexane.

Comparative Example 3: Preparation of Polypropylene Resin

Polypropylene was produced in the same manner as in Example 1 except that 10 mg of Supported catalyst-10 and 40 mg of Supported catalyst-11 (weight ratio of Supported catalyst-10 and Supported catalyst-11=2:8) instead of 50 mg of Supported catalyst-1 were dispersed in hexane.

Comparative Example 4: Preparation of Polypropylene Resin

Polypropylene was produced in the same manner as in Example 1 except that 10 mg of Supported catalyst-10 and 40 mg of Supported catalyst-12 (weight ratio of Supported catalyst-10 and Supported catalyst-12=2:8) instead of 50 mg of Supported catalyst-1 were dispersed in hexane.

Comparative Example 5: Preparation of Polypropylene Resin

Polypropylene was produced in the same manner as in Comparative Example 4 except that ethylene was not added.

Comparative Example 7: Preparation of Polypropylene Resin

At room temperature, the interior of a stainless steel autoclave (high-pressure reactor) having an internal capacity of 2 L was completely substituted with nitrogen. After injecting 2 ml of triisobutylaluminum (as a 1 M solution in hexane) and 400 g of propylene into the reactor while maintaining nitrogen purging, a dispersion prepared by dispersing 50 mg of Supported catalyst-9 in 5 ml of hexane was added into the reactor using high pressure nitrogen. Subsequently, polymerization was carried out at 70° C. for 60 minutes. After subsequently removing unreacted propylene through a discharge line, the reactor was set at a temperature of 80° C. and a pressure of 12 bar, 33 g of ethylene was added into the reactor, and a gas-phase reaction was carried out for 30 minutes. After polymerization was completed, the reactor was cooled to room temperature, and as a result of subsequently removing unreacted propylene and ethylene through a discharge line, a white powdery solid was obtained. The obtained white powdery solid was dried for 15 hours or more while heating at 80° C. using a vacuum oven, and thereby a final polypropylene resin was obtained.

<Evaluation Methods>

(1) Ethylene Content (EL in PP and EL in Rubber)

The ethylene content was analyzed through $^{13}$C-NMR analysis using Bruker 300 MHz. In Table 3 below, "EL in PP" refers to the amount of ethylene included in crystalline polypropylene, and "EL in rubber" refers to the amount of ethylene included in rubbery polypropylene.

(2) Proportion of Rubbery Polypropylene (Proportion of Rubber)

The proportion of rubbery polypropylene was determined by measuring the amount of a polypropylene resin component dissolved in xylene, that is, the amount of atactic polypropylene soluble in xylene.

Specifically, after drying 2 g of each of the final polypropylene resins produced according to Examples 1 to 16 and Comparative Examples 1 to 7 in a 80° C., 1 kPa vacuum oven for 20 minutes, the polypropylene resin A was input into a flask containing 200 ml of xylene, and was heated with stirring while being refluxed in the flask. When the solution contained in the flask became transparent, the solution was cooled to room temperature for 30 minutes, and the contents were filtered with filter paper. The filtered solution was dried in a 200° C. oven and then dried under vacuum, and thus a reaction product B in a solid form was obtained, and the weight of the reaction product was measured. The ratio of the reaction product B in a solid form to the dried polypropylene resin A is shown as the proportion of rubber (proportion of rubbery polypropylene) in Table 3 below.

(3) Melting Point (Tm)

The melting point was measured at a rate of 10° C./min under a nitrogen atmosphere and second heating conditions using a DuPont DSC 2910.

(4) Melt Index (MI)

The weight (g) of resin discharged through an orifice (inner diameter: 2.09 mm, length: 8 mm) for 10 minutes at a temperature of 230° C. under a load of 2.16 kg in accordance with ASTM D1238 was measured and shown as the melt index.

(5) Activity

After measuring the weight (kg) of a polypropylene resin produced for one hour per weight (g) of a catalyst used, catalytic activity was calculated according to Mathematical Formula 1 below.

[Mathematical Formula 1]

Activity (Kg/gCat·hr)=Amount of polypropylene produced (kg/hr)/Amount of catalyst (g)

TABLE 3

| | Supported catalyst | PL (g) | EL (g) | EL in PP (%) | EL in rubber (%) | Proportion of rubber (%) | Tm (° C.) | MI (g/10 min) | Activity (kg/gCat · hr) | Occurrence of fouling |
|---|---|---|---|---|---|---|---|---|---|---|
| Example 1 | Supported catalyst-1 | 500 | 15 | 2.3 | 12 | 12 | 136 | 8.9 | 4.1 | x |
| Example 2 | Supported catalyst-2 | 500 | 15 | 2.0 | 13 | 18 | 138 | 7.1 | 2.9 | x |
| Example 3 | Supported catalyst-1 | 500 | — | — | — | 12 | 152 | 1.0 | 3.7 | x |
| Example 4 | Supported catalyst-2 | 500 | — | — | — | 16 | 152 | 0.6 | 3.0 | x |
| Example 5 | Supported catalyst-3 | 500 | 15 | 2.2 | 13 | 13 | 136 | 9.1 | 4.3 | x |
| Example 6 | Supported catalyst-4 | 500 | 15 | 2.0 | 13 | 19 | 137 | 7.2 | 3.0 | x |
| Example 7 | Supported catalyst-3 | 500 | — | — | — | 13 | 152 | 0.9 | 3.9 | x |
| Example 8 | Supported catalyst-4 | 500 | — | — | — | 16 | 152 | 0.6 | 2.4 | x |
| Example 9 | Supported catalyst-5 | 500 | 15 | 1.1 | 15 | 12 | 146 | 0.6 | 3.8 | x |
| Example 10 | Supported catalyst-6 | 500 | 15 | 1.0 | 15 | 20 | 146 | 0.8 | 2.8 | x |
| Example 11 | Supported catalyst-5 | 500 | — | — | — | 12 | 152 | 0.2 | 4.9 | x |
| Example 12 | Supported catalyst-6 | 500 | — | — | — | 17 | 152 | 0.3 | 4.0 | x |
| Example 13 | Supported catalyst-7 | 500 | 15 | 1.0 | 15 | 13 | 146 | 0.6 | 3.8 | x |
| Example 14 | Supported catalyst-8 | 500 | 15 | 1.0 | 15 | 19 | 146 | 0.7 | 2.7 | x |
| Example 15 | Supported catalyst-7 | 500 | — | — | — | 12 | 152 | 0.2 | 4.7 | x |
| Example 16 | Supported catalyst-8 | 500 | — | — | — | 19 | 152 | 0.3 | 4.0 | x |
| Comparative Example 1 | Supported catalyst-9 + Supported catalyst-11 | 500 | 15 | 2.5 | 10 | 9 | 134 | 9.2 | 2.1 | o |
| Comparative Example 2 | Supported catalyst-9 + Supported catalyst-12 | 500 | 15 | 2.4 | 10 | 10 | 134 | 9.1 | 2.1 | o |
| Comparative Example 3 | Supported catalyst-10 + Supported catalyst-11 | 500 | 15 | 1.1 | 12 | 11 | 145 | 0.7 | 1.4 | o |
| Comparative Example 4 | Supported catalyst-10 + Supported catalyst-12 | 500 | 15 | 1.1 | 12 | 11 | 145 | 0.7 | 1.4 | o |
| Comparative Example 5 | Supported catalyst-10 + Supported catalyst-12 | 500 | — | — | — | — | 152 | 0.4 | 1.0 | o |
| Comparative Example 6 | Supported catalyst-9 | 500 | 15 | 4.1 | — | — | 125 | 10 | 4.0 | x |
| Comparative Example 7 | Supported catalyst-9 | 400 | 33 | — | 18 | 9 | 152 | 6.7 | 2.9 | x |

Referring to Table 3, in the case of Examples 1 to 16 in which a supported catalyst in which first and second transition metal compounds of the present invention are co-supported, it can be seen that polypropylene resins with a higher proportion of rubbery polypropylene than in the case of Comparative Examples 1 to 7 were produced, and a fouling phenomenon did not occur.

However, in the case of using a combination of a supported catalyst in which only a first transition metal compound is supported and a supported catalyst in which only a second transition metal compound is supported, when ethylene was additionally added (Comparative Examples 1 to 4), the formed rubbery polypropylene was separated, and thus a fouling phenomenon occurred, and when ethylene was not additionally added (Comparative Example 5), rubbery polypropylene was not formed, and a fouling phenomenon occurred. In addition, in the case of Comparative Example 6 in which a polyester resin was produced only using a supported catalyst in which only a first transition metal compound is supported, rubbery polypropylene was not formed.

In addition, in the case of using supported catalysts in which first and second transition metal compounds are co-supported as in Examples 1 to 16, higher catalytic activity was exhibited than in the case of using a combination of a supported catalyst in which only a first transition metal compound is supported and a supported catalyst in which only a second transition metal compound is supported as in Comparative Examples 1 to 5. From this, it can be seen that when a combination of a supported catalyst in which only a first transition metal compound is supported and a supported catalyst in which only a second transition metal compound is supported is used, activity decreases due to the combined use.

Meanwhile, in the case of Examples 3, 4, 7, 8, 11, 12, 15, and 16 of the present invention, it can be seen that a polypropylene resin with a high proportion of rubbery polypropylene was produced even though ethylene was not added. In addition, in the case of Examples 1, 2, 5, 6, 9, 10, 13, and 14 in which ethylene was added, it can be seen that rubbery polypropylene was formed with only one polymerization step without an additional process for ethylene. On the other hand, in the case of Comparative Example 7, it can be seen that, even though more ethylene was added than in Examples and an additional gas-phase reaction was carried out, a polypropylene resin with a lower proportion of rubbery polypropylene than in Examples was produced.

In addition, referring to Table 3, it can be seen that the proportion of rubbery polypropylene varied according to the ratio between the co-supported first and second transition metal compounds. From this, it can be seen that when the ratio between the co-supported transition metal compound are appropriately adjusted according to the present invention, a polypropylene resin including rubbery polypropylene at an appropriate proportion for use can be easily produced.

As described above, although the present invention has been described through a limited number of exemplary embodiments and drawings, the present invention is not limited thereto, and it goes without saying that various modifications and changes can be made by those of ordinary skill in the art to which the present invention pertains within the scope of the technical spirit of the present invention and the scope of the claims to be described below and equivalents thereof.

The invention claimed is:
1. A supported catalyst for propylene polymerization, comprising:
a first transition metal compound represented by Chemical Formula 1 below;
a second transition metal compound represented by Chemical Formula 3 below; and
a carrier configured to co-support the first and second transition metal compounds,

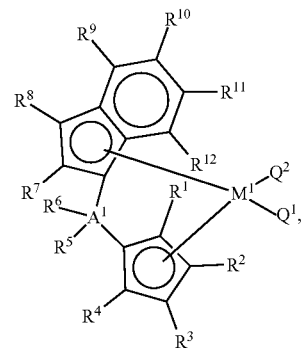

Chemical Formula 1 wherein, in Chemical Formula 1, $M^1$ is a group 4 transition metal, $Q^1$ and $Q^2$ are the same or different, and are each independently: a halogen group; a ($C_1$-$C_{20}$) alkyl group; a ($C_2$-$C_{20}$) alkenyl group; a ($C_2$-$C_{20}$) alkynyl group; a ($C_6$-$C_{20}$) aryl group: a ($C_1$-$C_{20}$) alkyl ($C_6$-$C_{20}$) aryl group; a ($C_6$-$C_{20}$) aryl ($C_1$-$C_{20}$) alkyl group; a ($C_1$-$C_{20}$) alkylamido group; a ($C_6$-$C_{20}$) arylamido group; or a ($C_1$-$C_{20}$) alkylidene group, $A^1$ is a group 14 element, $R^1$, $R^2$, $R^3$, $R^4$, $R^7$, $R^8$, $R^9$, $R^{10}$, $R^{11}$, and $R^{12}$ are the same or different, and are each independently: hydrogen; a ($C_1$-$C_{20}$) alkyl group unsubstituted or substituted with an acetal group or ether group; a ($C_2$-$C_{20}$) alkenyl group unsubstituted or substituted with an acetal group or ether group; a ($C_6$-$C_{20}$) aryl group unsubstituted or substituted with an acetal group or ether group; a ($C_1$-$C_{20}$) alkyl ($C_6$-$C_{20}$) aryl group unsubstituted or substituted with an acetal group or ether group; a ($C_6$-$C_{20}$) aryl ($C_1$-$C_{20}$) alkyl group unsubstituted or substituted with an acetal group or ether group; or a ($C_1$-$C_{20}$) silyl group unsubstituted or substituted with an acetal group or ether group, two or more groups among $R^1$, $R^2$, $R^3$, and $R^4$ are capable of forming an aliphatic ring or aromatic ring by being bonded to each other, two or more groups among $R^7$, $R^8$, $R^9$, $R^{10}$, $R^{11}$, and $R^{12}$ are capable of forming an aliphatic ring or aromatic ring by being bonded to each other, and $R^5$ and $R^6$ are the same or different, and are each independently: hydrogen; a ($C_1$-$C_{20}$) alkyl group; a ($C_2$-$C_{20}$) alkenyl group; a ($C_2$-$C_{20}$) alkynyl group; a ($C_6$-$C_{20}$) aryl group; a ($C_1$-$C_{20}$) alkyl ($C_6$-$C_{20}$) aryl group; a ($C_6$-$C_{20}$) aryl ($C_1$-$C_{20}$) alkyl group; a ($C_1$-$C_{20}$) alkylamido group; a ($C_6$-$C_{20}$) arylamido group; or a ($C_1$-$C_{20}$) alkylidene group, Chemical Formula 3

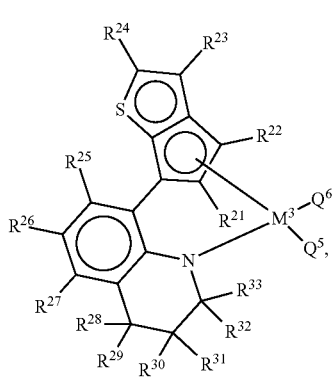

wherein, in Chemical Formula 3, $M^3$ is a group 4 transition metal, $Q^5$ and $Q^6$ are the same or different, and are each independently: a halogen group; a ($C_1$-$C_{20}$) alkyl group; a ($C_2$-$C_{20}$) alkenyl group; a ($C_2$-$C_{20}$) alkynyl group; a ($C_6$-$C_{20}$) aryl group; a ($C_1$-$C_{20}$) alkyl ($C_6$-$C_{20}$) aryl group; a ($C_6$-$C_{20}$) aryl ($C_1$-$C_{20}$) alkyl group; a ($C_1$-$C_{20}$) alkylamido group; a ($C_6$-$C_{20}$) arylamido group; or a ($C_1$-$C_{20}$) alkylidene group, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, and $R^{33}$ are the same or different, and are each independently: hydrogen; a ($C_1$-$C_{20}$) alkyl group unsubstituted or substituted with an acetal group or ether group; a ($C_2$-$C_{20}$) alkenyl group unsubstituted or substituted with an acetal group or ether group; a ($C_6$-$C_{20}$) aryl group unsubstituted or substituted with an acetal group or ether group; a ($C_1$-$C_{20}$) alkyl ($C_6$-$C_{20}$) aryl group unsubstituted or substituted with an acetal group or ether group; a ($C_6$-$C_{20}$) aryl ($C_1$-$C_{20}$) alkyl group unsubstituted or substituted with an acetal group or ether group; or a ($C_1$-$C_{20}$) silyl group unsubstituted or substituted with an acetal group or ether group; a ($C_1$-$C_{20}$) alkoxy group; or a ($C_6$-$C_{20}$) aryloxy group, and two or more groups among $R^{21}$, $R^{22}$, $R^{23}$, $R^{24}$, $R^{25}$, $R^{26}$, and $R^{27}$ are capable of forming an aliphatic ring or aromatic ring by being bonded to each other.

2. The supported catalyst of claim 1, wherein the $R^9$ is a ($C_6$-$C_{20}$) aryl group unsubstituted or substituted with an acetal group or ether group; or a ($C_1$-$C_{20}$) alkyl ($C_6$-$C_{20}$) aryl group unsubstituted or substituted with an acetal group or ether group.

3. The supported catalyst of claim 1, wherein the $A^1$ is carbon (C) or silicon (Si), and the $R^5$, and the $R^6$, are each independently hydrogen or a methyl group.

4. The supported catalyst of claim 1, wherein the $Q^1$, the $Q^2$, the $Q^5$, and the $Q^6$, are each independently:

a halogen group selected from among F, Cl, Br, and I;

a methyl group; or an ethyl group.

5. The supported catalyst of claim 1, wherein the compound represented by Chemical Formula 1 is any one of compounds represented by Chemical Formulas 1-1 to 1-6 below, and the compound represented by Chemical Formula 3 is any one of compounds represented by Chemical Formulas 3-1 to 3-8 below Chemical Formula 1-1

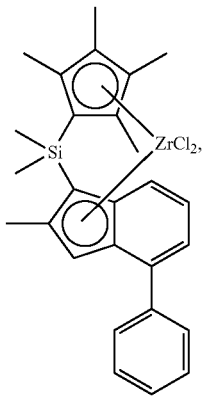

Chemical Formula 1-2

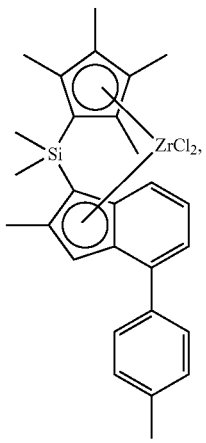

Chemical Formula 1-3

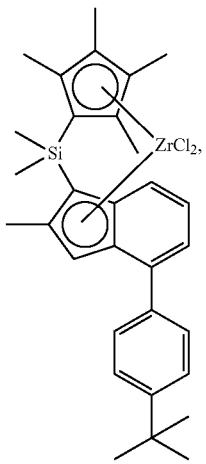

Chemical Formula 1-4
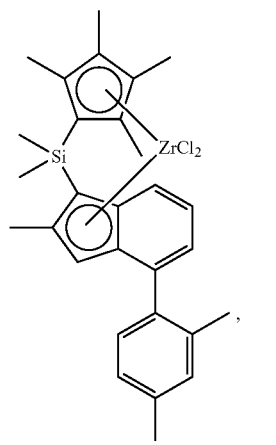
Chemical Formula 1-5
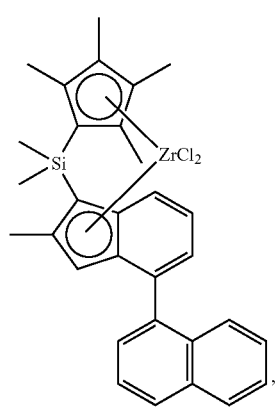
Chemical Formula 1-6
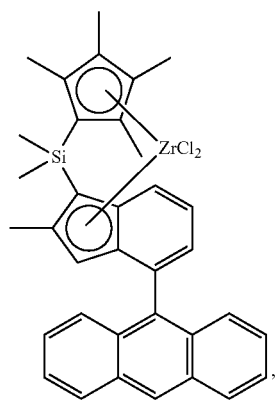
Chemical Formula 3-1
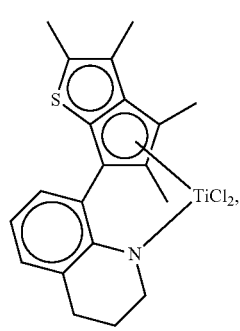
Chemical Formula 3-2
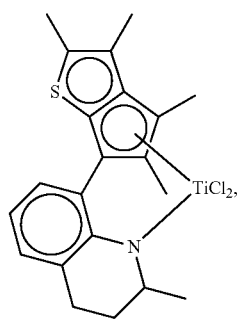
Chemical Formula 3-3
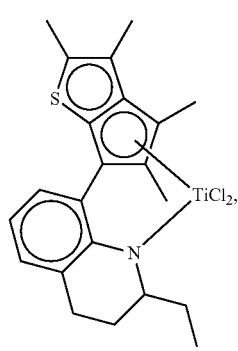
Chemical Formula 3-4
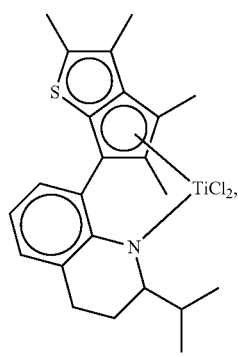
Chemical Formula 3-5
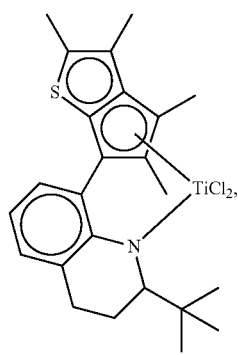

Chemical Formula 3-6

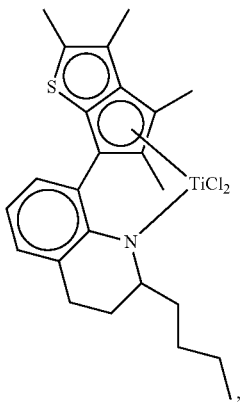

Chemical Formula 3-7

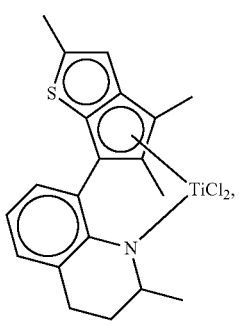

Chemical Formula 3-8

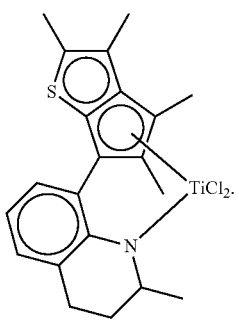

6. The supported catalyst of claim 1, wherein the first transition metal compound and the second transition metal compound are included in a molar ratio ranging from 50:50 to 10:90.

7. The supported catalyst of claim 1, further comprising one or more cocatalyst compounds selected from the group consisting of a compound having a unit represented by Chemical Formula 5 below, a compound represented by Chemical Formula 6 below, and a compound represented by Chemical Formula 7 below:

Chemical Formula 5

—[Al(Ra)—O]$_n$—, wherein, in Chemical Formula 5, n is an integer of 2 or more, Al is aluminum, O is oxygen, and Ra is: a halogen group; or a ($C_1$-$C_{20}$) hydrocarbyl group unsubstituted or substituted with a halogen group, Chemical Formula 6

Q(Rb)$_3$, wherein, in Chemical Formula 6, Q is: aluminum; or boron, and Rbs are the same or different, and are each independently: a halogen group; or a ($C_1$-$C_{20}$) hydrocarbyl group unsubstituted or substituted with a halogen group, Chemical Formula 7

[W]$^+$[Z(Rc)$_4$]$^-$, wherein, in Chemical Formula 7, [W]$^+$ is: a cationic Lewis acid; or a cationic Lewis acid to which a hydrogen atom is bonded, Z is a group 13 element, and Rcs are the same or different, and are each independently: a ($C_6$-$C_{20}$) aryl group substituted with one or more substituents selected from the group consisting of a halogen group, a ($C_1$-$C_{20}$) hydrocarbyl group, an alkoxy group, and a phenoxy group; or a ($C_1$-$C_{20}$) alkyl group substituted with one or more substituents selected from the group consisting of a halogen group, a ($C_1$-$C_{20}$) hydrocarbyl group, an alkoxy group, and a phenoxy group.

8. A method of producing a polypropylene resin, comprising carrying out a propylene polymerization reaction in the presence of the supported catalyst of claim 1.

9. The method of claim 8, wherein crystalline polypropylene and rubbery polypropylene are simultaneously formed through the polymerization reaction.

10. The method of claim 9, wherein the rubbery polypropylene includes one or more selected from the group consisting of:
a rubbery propylene homopolymer, and
a rubbery propylene copolymer polymerized by additionally adding other types of monomers during the polymerization of propylene.

11. The method of claim 10, wherein the other types of monomers include one or more selected from the group consisting of ethylene, butene, hexene, and octene.

12. The method of claim 9, wherein the rubbery polypropylene is included in an amount of 5% and more and 30% or less based on a total weight of the polypropylene resin.

13. The method of claim 8, wherein the polymerization is carried out in a phase selected from the group consisting of a liquid phase, a bulk phase, and a slurry phase.

* * * * *